United States Patent
Dai et al.

(10) Patent No.: US 9,532,351 B2
(45) Date of Patent: Dec. 27, 2016

(54) DOWNLINK CONTROL INFORMATION TRANSMITTING METHOD, DETECTING METHOD, BASE STATION AND USER EQUIPMENT

(71) Applicant: ZTE Corporation, Shenzhen (CN)

(72) Inventors: Bo Dai, Shenzhen (CN); Yijian Chen, Shenzhen (CN); Zhisong Zuo, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 107 days.

(21) Appl. No.: 14/400,008

(22) PCT Filed: Dec. 26, 2012

(86) PCT No.: PCT/CN2012/087515
§ 371 (c)(1),
(2) Date: Nov. 10, 2014

(87) PCT Pub. No.: WO2013/166847
PCT Pub. Date: Nov. 14, 2013

(65) Prior Publication Data
US 2015/0117354 A1    Apr. 30, 2015

(30) Foreign Application Priority Data
May 11, 2012  (CN) .......................... 2012 1 0146408

(51) Int. Cl.
*H04W 48/16* (2009.01)
*H04W 72/04* (2009.01)
(Continued)

(52) U.S. Cl.
CPC .......... *H04W 72/042* (2013.01); *H04L 5/0053* (2013.01); *H04W 48/16* (2013.01); *H04W 48/12* (2013.01)

(58) Field of Classification Search
CPC ..... H04W 72/042; H04W 48/16; H04W 48/12
See application file for complete search history.

(56) References Cited

U.S. PATENT DOCUMENTS

2007/0217540 A1* 9/2007 Onggosanusi ....... H04B 7/0417
375/267
2011/0249633 A1* 10/2011 Hong .................... H04L 5/0053
370/329
(Continued)

FOREIGN PATENT DOCUMENTS

| CN | 101478808 A | 7/2009 |
| CN | 102255688 A | 11/2011 |

(Continued)

OTHER PUBLICATIONS

International Search Report for corresponding application PCT/CN2012/087515 filed Dec. 26, 2012; Mail date Mar. 28, 2013.
(Continued)

*Primary Examiner* — Chandrahas Patel
*Assistant Examiner* — Lan Huong Truong
(74) *Attorney, Agent, or Firm* — Cantor Colburn LLP

(57) ABSTRACT

A method for transmitting downlink control information, a detecting method, a base station and a UE are provided in the present invention. The detecting method includes: the UE detects downlink control information beared by ePDCCH in a resource block according to a resource block set and pre-defined information configured by the base station; wherein the pre-defined information at least includes one of the followings: sub-carrier position information detected in the resource block set, enhanced control channel unit information detected in the resource block set, a mapping mode of the ePDCCH, aggregation level configuration information detected in the resource block set, the amount of candidate set corresponding to the detected aggregation level in the resource block set and a downlink control information format. In the present invention, the UE is agilely indicated (Continued)

to detected the downlink control information beared by the ePDCCH in the corresponding physical resource block according to the configured resource block set and the pre-defined information, so as to save resources of space detected and searched by the UE, thus scheduling efficient of the system is improved.

30 Claims, 12 Drawing Sheets

(51) Int. Cl.
  *H04L 5/00* (2006.01)
  *H04W 48/12* (2009.01)

(56) References Cited

U.S. PATENT DOCUMENTS

| | | | | |
|---|---|---|---|---|
| 2012/0176987 | A1* | 7/2012 | Kaminski | H04L 5/0053 370/329 |
| 2013/0044664 | A1* | 2/2013 | Nory | H04L 1/0045 370/311 |
| 2013/0114419 | A1* | 5/2013 | Chen | H04L 5/0053 370/248 |
| 2013/0252606 | A1* | 9/2013 | Nimbalker | H04B 17/309 455/434 |

FOREIGN PATENT DOCUMENTS

| | | |
|---|---|---|
| CN | 02355732 A | 2/2012 |
| CN | 102368871 A | 3/2012 |

OTHER PUBLICATIONS

European Search Report for corresponding application EP12876473; Report dated Jun. 7, 2015.

Huawei et al, "UE-Specific search space for ePDCCH", 3GPP Draft; R1-120998, 3rd Generation Partnership Project; vol. RAN WG1, No. 20120326-20120330, Mar. 20, 2012, XP050599309.

ZTE Corporation: Mapping Design for Enhanced PDCCH, 3GPP Draft, R1-121055, 3rd Generation Partnership Project, vol. RAN, 201 Mar. 2012, XP050599358.

ZTE, "Search space design for enhanced PDCCH", 3GPP Draft, R1-120314 Search Space Design for Enhanced PDCCH, 3rd Generation Partnership Project (3GPP), vol. RAN, Jan. 31, 2012, XP050562843.

ZTE: :Consideration on resource configuration for enhanced PDCCH, 3GPP Draft, R1-121053 Consideration on Resource Configuration for Enhanced PDCCH, vol. RAN WG1, Mar. 20, 2012, XP050599356.

* cited by examiner

DOWNLINK CONTROL INFORMATION TRANSMITTING METHOD, DETECTING METHOD, BASE STATION AND USER EQUIPMENT

TECHNICAL FIELD

The present invention relates to the field of communications, and in particular to a method for transmitting downlink control information, a detecting method, a base station and a user equipment.

BACKGROUND

A long term evolution (Long Term Evolution, LTE) system has two types of frame structures, wherein frame structure type 1 (Type 1) is applicable to frequency division full duplex (Frequency Division Duplex, FDD) and frequency division half duplex. Each wireless frame has a length of 10 ms and consists of 20 time slots, and each time slot is 0.5 ms and is numbered from 0 to 19. FIG. 1 is a frame structural schematic diagram of an FDD mode, and as shown in FIG. 1, one subframe consists of two continuous time slots, for example, subframe i consists of two continuous slots 2i and 2i+1.

Frame structure type 2 (Type 2) is applicable to time division duplex (TDD, Time Division Duplex). FIG. 2 is a frame structural schematic diagram of a TDD mode, and as shown in FIG. 2, one wireless frame has a length of 10 ms and consists of two half frames with a length of 5 ms. One half frame consists of five subframes with a length of 1 ms. A subframe is divided into a normal subframe and a special subframe, wherein the special subframe consists of a downlink pilot time slot (DwPTS), a guard period (GP) and an uplink pilot time slot (UpPTS), and the total length is 1 ms. Each subframe i consists of two time slots 2i and 2i+1 with a length of 0.5 ms.

In a long term evolution system and an LTE-Advance system, downlink control signalling (Downlink Control Information, DCI) contains DL Grant information relevant to downlink transmission which is required to be known by a terminal and UL Grant information relevant to uplink transmission which is required to be known by a UE, etc., and these physical layer control signalling is transmitted on a physical layer control channel (PDCCH), wherein DCI formats (DCI format) are divided into the following types: DCI format 0, DCI format 1, DCI format 1A, DCI format 1B, DCI format 1C, DCI format 1D, DCI format 2, DCI format 2A, DCI format 2B, DCI format 2C, DCI format 3 and DCI format 3A, etc., and DCI format size increases with the increase of system bandwidth.

In release (hereinafter "R") 8/9 of an LTE system and R10 of an LTE-Advance system, a physical layer control channel (Physical Downlink Control channel, PDCCH) for transmitting physical layer control signalling is usually configured on first N OFDM (orthogonal Frequency Division Multiplexing) symbols for transmitting, and the N symbols are usually called as a control signalling transmission area. Hereby in order to distinguish from a newly-added control signalling transmission area of a new release, a control signalling transmission area of R8/9/10 is called as a first control signalling transmission area in the present invention.

Available transmission resources of the first control signalling transmission area are divided into multiple CCE resource elements, and resources occupied by control information are allocated in the unit of CCE, and the resource element CCE herein also can be further divided into multiple REGs; one CCE consists of multiple discontinuous REGs, and usually one CCE consists of 9 REGs, and further, each REG consists of 4 basic resource elements, wherein one basic resource element bears one modulation symbol, and when QPSK modulation is sampled, one CCE can bear 72 bits.

One PDCCH has four aggregation levels, and the four aggregation levels respectively correspond to one PDCCH occupying 1, 2, 4 or 8 CCEs, being called as aggregation level 1, aggregation level 2, aggregation level 4 and aggregation level 8, also correspond to four formats of the PDCCH, that is to say, aggregation level represents physical resource size occupied by physical downlink control channel. Each aggregation level corresponds to g candidate sets, i.e. g positions which can transmit the PDCCH. A UE would blindly detect said four aggregation levels on a candidate set position corresponding to each aggregation level of the first control signalling transmission area so as to determine whether the PDCCH is transmitted, thereby acquiring corresponding downlink control information.

In a release after R10, in order to improve the transmission capacity of a control channel and support control signalling of more users, a new control channel area is considered to be established, and control signalling transmission resources of the same UE can be continuous time frequency resources so as to support a closed-loop precoding technology and improve transmission performance of control information.

Control signalling areas of new and old releases are as shown in FIG. 3, and control signalling of the new release divides part of transmission resources in a PDSCH transmission area of original R8/9/10 for using same in a second control signalling transmission area so as to support the closed-loop precoding technology when the control signalling is transmitted and improve the capacity of control signalling to support control signalling of more users.

Here in the second control signalling transmission area, a dedicated demodulation pilot (DMRS) in R10 can be reused to demodulate control signalling and better support precoding technology. In addition, the second control signalling transmission area is in the unit of RB and can better perform interference coordination.

At the same time, in the light of transmission robustness and no channel information, in the second control signalling transmission area, DMRS also can support open-loop diversity technology, such as SFBC technology or open-loop precoding technology.

In order to better understand the background of the present invention, the following gives some simple introduction about the resource definition of LTE-A: one resource element (RE) of an LTE is one sub-carrier on one OFDM symbol, and a downlink physical resource block (Resource Block, RB) consists of continuous 12 sub-carriers and continuous 14 (12 when an extended cyclic prefix is used) OFDM symbols, and is 180 kHz on a frequency domain and has a time length of a normal time slot on a time domain, i.e. 1 ms, as shown in FIG. 4 (a 5M system).

In order to transmit downlink control information in the second control signalling transmission area, the CCE is likewise required to be redefined, i.e. eCCE; several opinions about the definition of the size of the CCE are as follows: one is to still keep the definition of R8, i.e. 36 resource elements, and another one is 1/n of resource elements being contained in 1 physical resource block.

Problems existed in the conventional art are: the size of the second control signalling area is restricted by the size of a first control signalling area, and other signals, such as CRS, PSS/SSS, PBCH, PRS, CSI-RS, DM-RS and PRS may be transmitted in the second control signalling area, which will result in the decrease of the amount of valid bits of the downlink control information which may actually transmitted in the eCCE, thereby resulting in the increase of valid code rate of an ePDCCH, even the code rate exceeding 1, causing the downlink control information not decoding correctly; therefore, if a UE still performs blind detection fixedly according to four aggregation levels defined in an LTE system, a large amount of blind detection waste may exist, and the expanding of searching space is restricted, and scheduling blocking rate of the downlink control information is increased.

SUMMARY

The present invention provides a downlink control information transmitting method, a detecting method, a base station and a UE so as to at least solve the problem of detecting resource waste of a UE caused by the above-mentioned existing downlink control information mapping mode.

According to one aspect of the invention, a method for detecting downlink control information is provided, comprising: a UE detects downlink control information beared by an enhanced physical downlink control channel (ePDCCH) in a resource block according to a resource block set and pre-defined information configured by the base station; wherein the pre-defined information at least includes one of the followings: sub-carrier position information detected in the resource block set, enhanced control channel unit information detected in the resource block set, a mapping mode of the ePDCCH, aggregation level configuration information detected in the resource block set and the amount of candidate set and a downlink control information format corresponding to the detected aggregation level in the resource block set.

Preferably, the amount of resource blocks in a resource block set is one of the followings: 2, 4, 6, 8, 12 and 16.

Preferably, when the amount of resource blocks contained in the resource block set is greater than 4, the UE selects 2 or 4 resource blocks as a detected resource block set.

Preferably, a mapping mode of an ePDCCH comprises continuous mapping and/or discrete mapping.

Preferably, a downlink control information format is determined according to a mapping mode of data corresponding to downlink control information.

Preferably, ePDCCHs of the same aggregation level are configured to be of the same mapping mode.

Preferably, according to the size of a resource corresponding to an aggregation level, and according to an ascending order, all aggregation levels are ranked as N1, N2, ... Np, where p is a positive integer, wherein ePDCCHs corresponding to the aggregation levels N1, N2, ... Nq are configured to be continuous mapping, and ePDCCHs corresponding to the aggregation levels N(q+1) ... Np are configured to be discrete mapping, and q is a positive integer.

Preferably, q is configured by a base station.

Preferably, with regard to a TDD system, the set of aggregation levels, detected by the UE, on a special subframe is different from the set of aggregation levels detected by the UE on a normal subframe.

Preferably, with regard to the TDD system, on the special subframe, the UE determines a set of detected aggregation levels according to a configuration of the special subframe.

Preferably, the mode for determining detected aggregation levels at least comprises one of the followings: mode 1: the UE determining an aggregation level configuration to be detected according to a valid code rate of an eCCE of detected eCCEs transmitting downlink control information; mode 2: the UE determining an aggregation level configuration to be detected according to a maximal bit amount actually transmitted by an eCCE of detected eCCEs; mode 3: the UE determining an aggregation level configuration to be detected according to the category of the detected downlink control information format; and mode 4: a base station configuring an aggregation level detected by said UE.

Preferably, the aggregation levels detected by the UE are aggregation level a1, aggregation level a2, aggregation level a3 and aggregation level a4, and the amount of candidate sets corresponding to each aggregation level is respectively c1, c2, c3 and c4, and when the UE only detects aggregation level a2, aggregation level a3 and aggregation level a4, the amount of candidate sets corresponding to each aggregation level is c2, c3 and c4, or the amount of candidate sets corresponding to each aggregation level is d2, d3 and d4, wherein d2+d3+d4 is less than or equal to c1+c2+c3+c4, and a1, a2, a3, a4, c1, c2, c3, c4, d2, d3 and d4 are all positive integers.

Preferably, the aggregation levels detected by the UE are aggregation level a1, aggregation level a2, aggregation level a3 and aggregation level a4, and the amount of candidate sets corresponding to each aggregation level is respectively c1, c2, c3 and c4, wherein c1, c2, c3 and c4 are respectively 6, 6, 2 and 2, or are respectively 8, 4, 2 and 2, or are respectively 4, 8, 2 and 2, or are respectively 4, 4, 4 and 4, or are respectively 4, 6, 4 and 2.

Preferably, a resource block set comprises 4 resource blocks, and 1 resource block comprises 4 enhanced control channel units, and each enhanced control channel unit comprises 2 resource groups, and all resource groups are numbered from #0 to #31, and aggregation level a means that resources corresponding to the ePDCCH are a enhanced control channel units, and when said mapping mode is discrete mapping, the sub-carrier position information detected in said resource block set is at least one of the followings:

when the aggregation level is 1, the sub-carrier position information detected in the resource block set is one of {(#0, #16), (#2, #18)}, {(#1, #17), (#3, #19)}, {(#4, #20), (#6, #22)}, {(#5, #21), (#7, #23)}, {(#8, #24), (#10, #26)}, {(#9, #25), (#11, #27)}, {(#12, #28), (#14, #30)}, {(#13, #29), (#15, #31)}, {(#0, #16), (#1, #17), (#2, #18), (#3, #19)}, {(#4, #20), (#5, #21), (#6, #22), (#7, #23)}, {(#8, #24), (#9, #25), (#10, #26), (#11, #27)} and {(#12, #28), (#13, #29), (#14, #30), (#15, #31)} or a sub-carrier corresponding to a combined resource group;

or, when the aggregation level is 2, the sub-carrier position information detected in the resource block set is one of {(#0, #1, #16, #17), (#2, #3, #18, #19)}, {(#4, #5, #20, #21), (#6, #7, #22, #23)}, {(#8, #9, #24, #25), (#10, #11, #26, #27)}, {(#12, #13, #28, #29), (#14, #15, #30, #31)}, {(#0, #8, #16, #24), ((#2, #10, #18, #26))}, {(#1, #9, #17, #25), ((#3, #11, #19, #27))}, {(#4, #12, #20, #28), ((#6, #14, #22, #30))}, {(#5, #13, #21, #29), ((#7, #15, #23, #31))} or a sub-carrier corresponding to a combined resource group.

Preferably, the resource block set comprises 2 resource blocks, each resource block comprising 4 enhanced control channel units, and all enhanced control channel units are numbered from #0 to #7, and aggregation level a means that resources corresponding to the ePDCCH are a enhanced control channel units, and enhanced control channel unit information detected in the resource block set is at least one of the followings:

when the mapping mode is continuous mapping and the aggregation level is 1, the enhanced control channel unit information detected in the resource block set is from #0 to #7;

or, when the mapping mode is continuous mapping and the aggregation level is 2, the enhanced control channel unit information detected in the resource block set is {#0, #1}, {#2, #3}, {#4, #5} and {#6, #7};

or, when the mapping mode is continuous mapping and the aggregation level is 4, the enhanced control channel unit information detected in the resource block set is {#0, #1, #2, #3} and {#4, #5, #6, #7};

or, when the mapping mode is discrete mapping and the aggregation level is 2, the enhanced control channel unit information detected in the resource block set is {#0, #4}, {#1, #5}, {#2, #6,} and {#3, #7};

or, when the mapping mode is discrete mapping and the aggregation level is 4, the enhanced control channel unit information detected in the resource block set is {#0, #2, #4, #6} and {#1, #3, #5, #7}.

Preferably, the resource block set comprises 4 resource blocks, each resource block comprising 4 enhanced control channel units, and all enhanced control channel units are numbered from #0 to #15, and aggregation level a means that resources corresponding to the ePDCCH are a enhanced control channel units, and enhanced control channel unit information detected in the resource block set is at least one of the followings:

when the mapping mode is continuous mapping and the aggregation level is 1, the enhanced control channel unit information detected in the resource block set is {#0, #2, #4, #6, #8, #10, #12, #14} or {#1, #3, #5, #7, #9, #11, #13, #15};

or, when the mapping mode is continuous mapping and the aggregation level is 2, the enhanced control channel unit information detected in the resource block set is {(#0, #1), (#4, #5), (#8, #9), (#12, #13)} or {(#2, #3), (#6, #7), (#10, #11), (#14, #15)};

or, when the mapping mode is continuous mapping and the aggregation level is 4, the enhanced control channel unit information detected in the resource block set is {(#0, #1, #2, #3), (#8, #9, #10, #11)} or {(#4, #5, #6, #7), (#12, #13, #14, #15)};

or, when the mapping mode is discrete mapping and the aggregation level is 2, the enhanced control channel unit information detected in the resource block set is {(#0, #8), (#2, #10), (#4, #12), (#6, #14)} or {(#1, #9), (#3, #11), (#5, #13), (#7, #15)};

or, when the mapping mode is discrete mapping and the aggregation level is 4, the enhanced control channel unit information detected in the resource block set is {(#0, #4, #8, #12), (#2, #6, #10, #14)} or {(#1, #5, #9, #13), (#3, #7, #11, #15)};

or, when the mapping mode is discrete mapping and the aggregation level is 8, the enhanced control channel unit information detected in the resource block set is {(#0, #2, #4, #6, #8, #10, #12, #14)} or {(#1, #3, #5, #7, #8, #9, #11, #13)}.

Preferably, according to a mode of time domain first and then frequency domain, resources are divided in accordance with 1 or 2 resource elements being granularity.

Preferably, groups are divided according to frequency domain sub-carriers, and resource dividing methods in different groups are different.

Preferably, different cyclic prefixes correspond to different aggregation levels, or different cyclic prefixes correspond to different amounts of candidate sets.

According to another aspect of the invention, a UE is provided, comprising: a receiving module, configured to receive a resource block set and pre-defined information configured by a base station, wherein the pre-defined information at least comprises one of the followings: sub-carrier position information detected in the resource block set, enhanced control channel unit information detected in the resource block set, a mapping mode of the ePDCCH, aggregation level configuration information detected in the resource block set and the amount of candidate set and a downlink control information format corresponding to the detected aggregation level in the resource block set; and a detection module, configured to detect downlink control information beared by an enhanced physical downlink control channel (ePDCCH) on a resource block according to the resource block set and the pre-defined information.

Preferably, the amount of resource blocks in a resource block set is one of the followings: 2, 4, 6, 8, 12 and 16.

Preferably, when the amount of resource blocks contained in the resource block set is greater than 4, the UE selects 2 or 4 resource blocks as a detected resource block set.

Preferably, with regard to a TDD system, the UE detects sets of different aggregation levels on a special subframe and a normal subframe.

Preferably, with regard to the TDD system, on the special subframe, the UE determines a set of detected aggregation levels according to a configuration of the special subframe.

Preferably, the mode for determining detected aggregation levels at least comprises one of the followings: mode 1: the UE determining an aggregation level configuration to be detected according to a valid code rate of an eCCE of detected eCCEs transmitting downlink control information; mode 2: the UE determining an aggregation level configuration to be detected according to a maximal bit amount actually transmitted by an eCCE of detected eCCEs; mode 3: the UE determining an aggregation level configuration to be detected according to the category of the detected downlink control information format; and mode 4: a base station configuring an aggregation level detected by the UE.

Preferably, the aggregation levels detected by said UE are aggregation level a1, aggregation level a2, aggregation level a3 and aggregation level a4, and the amount of candidate sets corresponding to each aggregation level is respectively c1, c2, c3 and c4, and when the UE only detects aggregation level a2, aggregation level a3 and aggregation level a4, the amount of candidate sets corresponding to each aggregation level is c2, c3 and c4, or the amount of candidate sets corresponding to each aggregation level is d2, d3 and d4, wherein d2+d3+d4 is less than or equal to c1+c2+c3+c4, and a1, a2, a3, a4, c1, c2, c3, c4, d2, d3 and d4 are all positive integers.

Preferably, the aggregation levels detected by the UE are aggregation level a1, aggregation level a2, aggregation level a3 and aggregation level a4, and the amount of candidate sets corresponding to each aggregation level is respectively c1, c2, c3 and c4, wherein c1, c2, c3 and c4 are respectively 6, 6, 2 and 2, or are respectively 8, 4, 2 and 2, or are respectively 4, 8, 2 and 2, or are respectively 4, 4, 4 and 4, or are respectively 4, 6, 4 and 2.

Preferably, a resource block set comprises 4 resource blocks, and 1 resource block comprises 4 enhanced control channel units, and each enhanced control channel unit comprises 2 resource groups, and all resource groups are numbered from #0 to #31, and aggregation level a means that resources corresponding to the ePDCCH are a enhanced control channel units, and when said mapping mode is discrete mapping, the sub-carrier position information detected in said resource block set is at least one of the followings:

when the aggregation level is 1, the sub-carrier position information detected in the resource block set is one of {(#0, #16), (#2, #18)}, {(#1, #17), (#3, #19)}, {(#4, #20), (#6, #22)}, {(#5, #21), (#7, #23)}, {(#8, #24), (#10, #26)}, {(#9, #25), (#11, #27)}, {(#12, #28), (#14, #30)}, {(#13, #29), (#15, #31)}, {(#0, #16), (#1, #17), (#2, #18), (#3, #19)}, {(#4, #20), (#5, #21), (#6, #22), (#7, #23)}, {(#8, #24), (#9, #25), (#10, #26), (#11, #27)} and {(#12, #28), (#13, #29), (#14, #30), (#15, #31)} or a sub-carrier corresponding to a combined resource group;

or, when the aggregation level is 2, the sub-carrier position information detected in the resource block set is one of {(#0, #1, #16, #17), (#2, #3, #18, #19)}, {(#4, #5, #20, #21), (#6, #7, #22, #23)}, {(#8, #9, #24, #25), (#10, #11, #26, #27)}, {(#12, #13, #28, #29), (#14, #15, #30, #31)}, {(#0, #8, #16, #24), ((#2, #10, #18, #26))}, {(#1, #9, #17, #25), ((#3, #11, #19, #27))}, {(#4, #12, #20, #28), ((#6, #14, #22, #30))}, {(#5, #13, #21, #29), ((#7, #15, #23, #31))} or a sub-carrier corresponding to a combined resource group.

Preferably, the resource block set comprises 2 resource blocks, each resource block comprising 4 enhanced control channel units, and all enhanced control channel units are numbered from #0 to #7, and aggregation level a means that resources corresponding to the ePDCCH are a enhanced control channel units, and enhanced control channel unit information detected in the resource block set is at least one of the followings:

when the mapping mode is continuous mapping and the aggregation level is 1, the enhanced control channel unit information detected in the resource block set is from #0 to #7;

or, when the mapping mode is continuous mapping and the aggregation level is 2, the enhanced control channel unit information detected in the resource block set is {#0, #1}, {#2, #3}, {#4, #5} and {#6, #7};

or, when the mapping mode is continuous mapping and the aggregation level is 4, the enhanced control channel unit information detected in the resource block set is {#0, #1, #2, #3} and {#4, #5, #6, #7};

or, when the mapping mode is discrete mapping and the aggregation level is 2, the enhanced control channel unit information detected in the resource block set is {#0, #4}, {#1, #5}, {#2, #6,} and {#3, #7};

or, when the mapping mode is discrete mapping and the aggregation level is 4, the enhanced control channel unit information detected in the resource block set is {#0, #2, #4, #6} and {#1, #3, #5, #7}.

Preferably, the resource block set comprises 4 resource blocks, each resource block comprising 4 enhanced control channel units, and all enhanced control channel units are numbered from #0 to #15, and aggregation level a means that resources corresponding to the ePDCCH are a enhanced control channel units, and enhanced control channel unit information detected in the resource block set is at least one of the followings:

when the mapping mode is continuous mapping and the aggregation level is 1, the enhanced control channel unit information detected in the resource block set is {#0, #2, #4, #6, #8, #10, #12, #14} or {#1, #3, #5, #7, #9, #11, #13, #15};

or, when the mapping mode is continuous mapping and the aggregation level is 2, the enhanced control channel unit information detected in the resource block set is {(#0, #1), (#4, #5), (#8, #9), (#12, #13)} or {(#2, #3), (#6, #7), (#10, #11), (#14, #15)};

or, when the mapping mode is continuous mapping and the aggregation level is 4, the enhanced control channel unit information detected in the resource block set is {(#0, #1, #2, #3), (#8, #9, #10, #11)} or {(#4, #5, #6, #7), (#12, #13, #14, #15)};

or, when the mapping mode is discrete mapping and the aggregation level is 2, the enhanced control channel unit information detected in the resource block set is {(#0, #8, #2, #10), (#4, #12), (#6, #14)} or {(#1, #9), (#3, #11), (#5, #13), (#7, #15)};

or, when the mapping mode is discrete mapping and the aggregation level is 4, the enhanced control channel unit information detected in the resource block set is {(#0, #4, #8, #12), (#2, #6, #10, #14)} or {(#1, #5, #9, #13), (#3, #7, #11, #15)};

or, when the mapping mode is discrete mapping and the aggregation level is 8, the enhanced control channel unit information detected in the resource block set is {(#0, #2, #4, #6, #8, #10, #12, #14)} or {(#1, #3, #5, #7, #8, #9, #11, #13)}.

Preferably, different cyclic prefixes correspond to different aggregation levels, or different cyclic prefixes correspond to different amounts of candidate sets.

According to a further aspect of the invention, a method for transmitting downlink control information is provided, comprising: a base station transmits a configured resource block set and pre-defined information to a UE so as to instruct the UE to detect downlink control information beared by an enhanced physical downlink control channel (ePDCCH) in a resource block; wherein the pre-defined information at least includes one of the followings: sub-carrier position information detected in the resource block set, enhanced control channel unit information detected in the resource block set, a mapping mode of the ePDCCH, aggregation level configuration information detected in the resource block set and the amount of candidate set and a downlink control information format corresponding to the detected aggregation level in the resource block set.

Preferably, the amount of resource blocks in a resource block set is one of the followings: 2, 4, 6, 8, 12 and 16.

Preferably, different cyclic prefixes correspond to different aggregation levels, or different cyclic prefixes correspond to different amounts of candidate sets.

According to another aspect of the invention, a base station is provided, and the base station includes: a configuration module, configured to configure a resource block set and pre-defined information, wherein the pre-defined information at least comprises one of the followings: sub-carrier position information detected in the resource block set, enhanced control channel unit information detected in the resource block set, a mapping mode of the ePDCCH, aggregation level configuration information detected in the resource block set, the amount of candidate set corresponding to the detected aggregation level in the resource block set and a downlink control information format; and a transmitting module, configured to transmit the resource block set and pre-defined information to a UE so as to instruct the UE to detect downlink control information beared by an enhanced physical downlink control channel (ePDCCH) on a resource block.

Preferably, the amount of resource blocks in a resource block set is one of the followings: 2, 4, 6, 8, 12 and 16.

Preferably, different cyclic prefixes correspond to different aggregation levels, or different cyclic prefixes correspond to different amounts of candidate sets.

In the present invention, the UE is agilely indicated to detected the downlink control information beared by the ePDCCH in the corresponding physical resource block according to the resource block set and the pre-defined information configured by a base station, so as to save resources of space detected and searched by the UE, thus scheduling efficient of the system is improved.

BRIEF DESCRIPTION OF THE DRAWINGS

Drawings, provided for further understanding of the present invention and forming a part of the specification, are used to explain the present invention together with embodiments of the present invention rather than to limit the present invention. In the accompanying drawings:

FIG. 14 shows a schematic diagram of a search space of ePDCCH continuous mapping based on a PRB set according to embodiment one of the disclosure;

FIG. 15 shows a schematic diagram of a D (discrete mapping) search space based on a PRB set according to embodiment one of the disclosure;

FIG. 16 shows a schematic diagram of an L (continuous mapping) search space based on a PRB set and configuration signalling according to embodiment one of the disclosure;

FIGS. 17 and 18 show schematic diagrams of a D search space (on the basis of eCCE discreteness) based on a PRB set and configuration signalling according to embodiment one of the disclosure;

FIGS. 19 and 20 show schematic diagrams of a D search space (on the basis of eREG discreteness) based on a PRB set and configuration signalling according to embodiment one of the disclosure;

DESCRIPTION OF EMBODIMENTS

The preferred embodiments are described in conjunction with the drawings as follows. It should be noted that the embodiments and the characteristics of the embodiments can be combined with each other if no conflict is caused.

Figure 1:
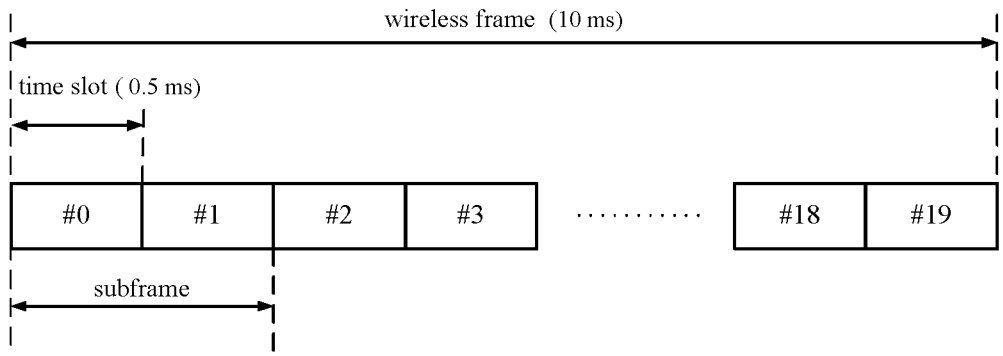
FIG. 1 shows a schematic diagram of a frame structure in an FDD mode according to relevant technologies.
Figure 2:
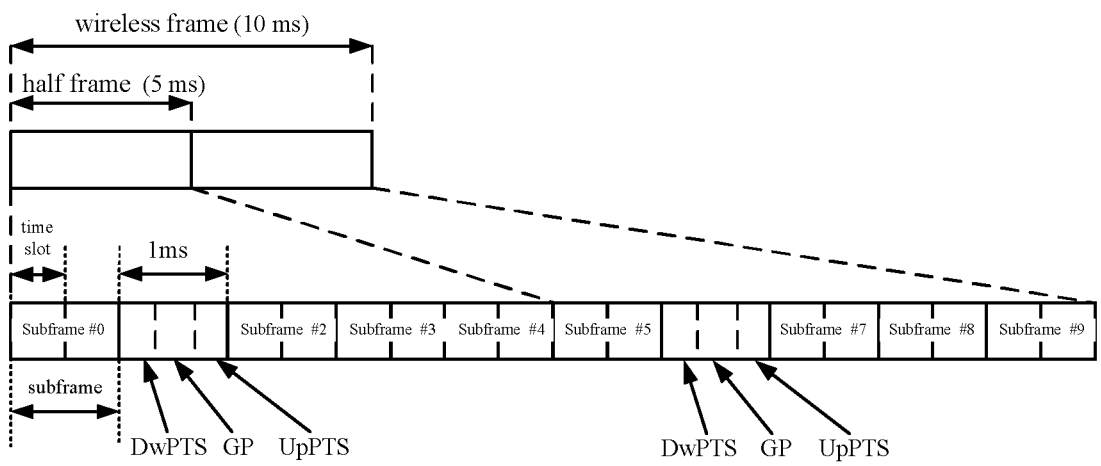
FIG. 2 shows a schematic diagram of a frame structure in a TDD mode according to relevant technologies.
Figure 3:
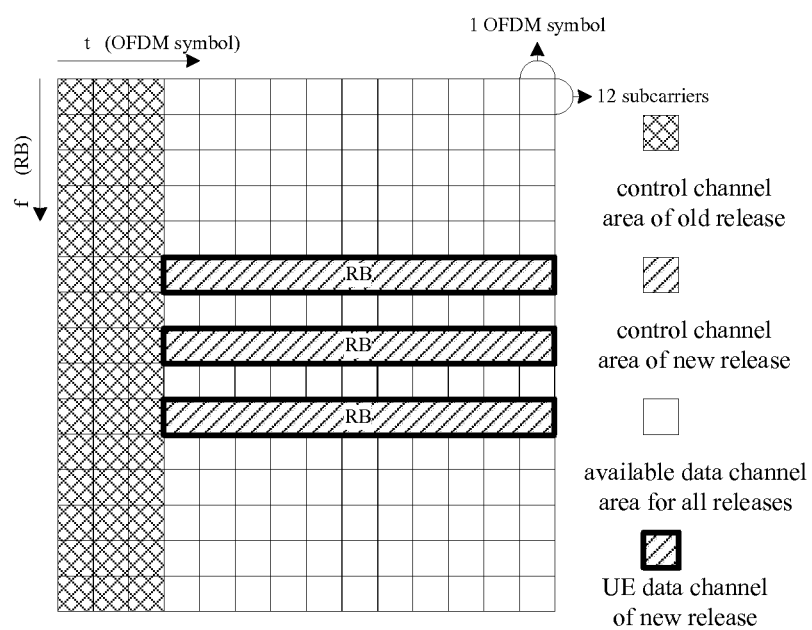
FIG. 3 shows a schematic diagram of a control signalling area distribution in new and old releases according to relevant technologies.
Figure 4:
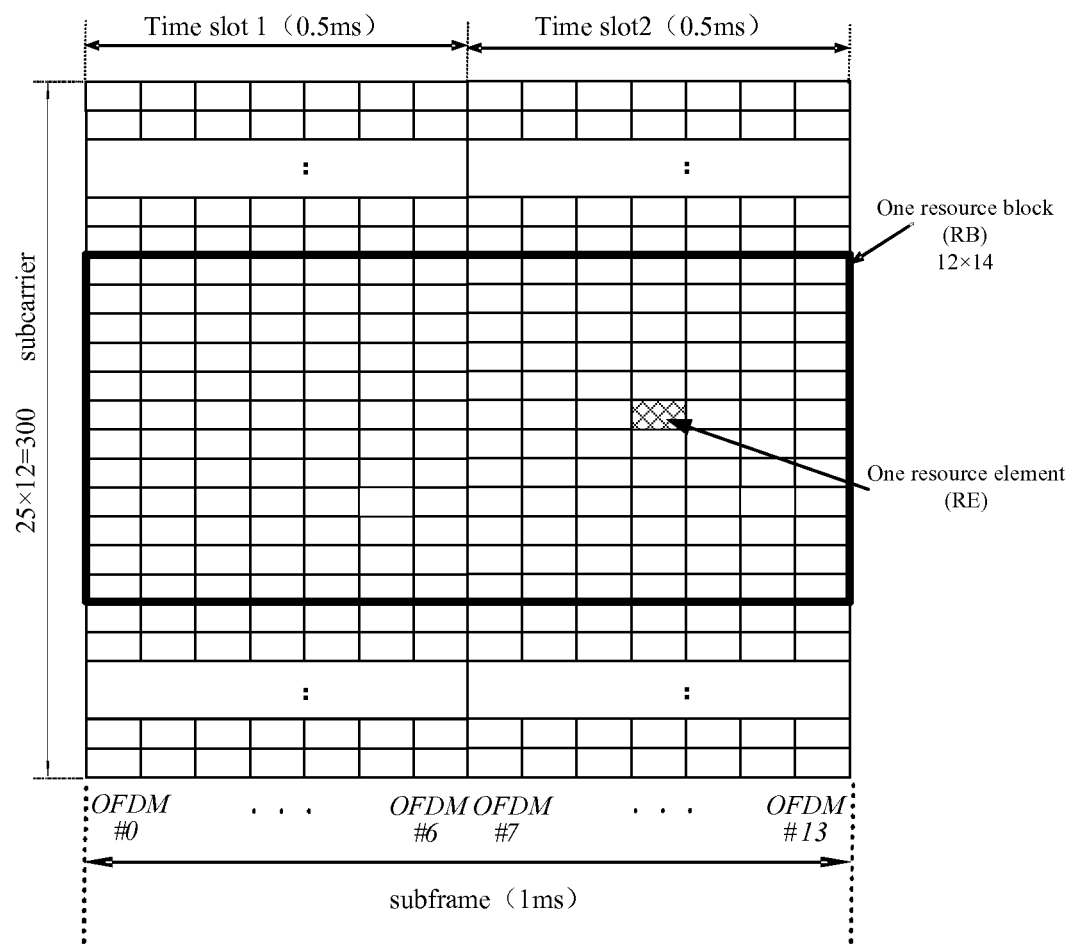
FIG. 4 shows a schematic diagram of a resource block of LTE-A according to relevant technologies.
Figure 5:
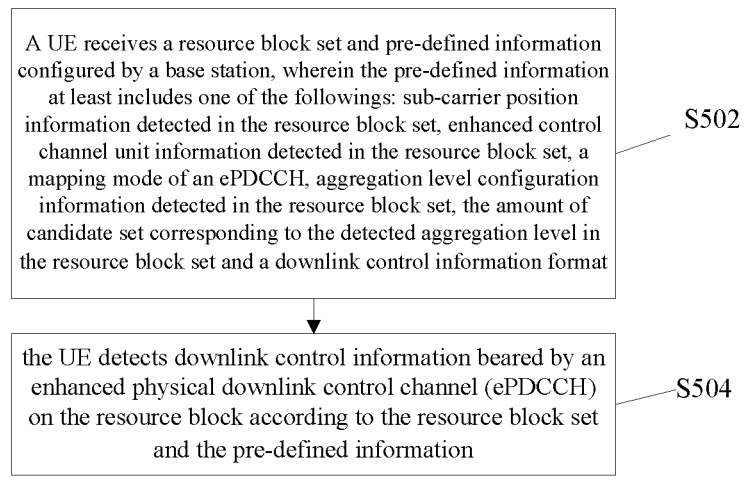
FIG. 5 shows a flowchart of a method for detecting downlink control information according to an embodiment of the disclosure.

FIG. 5 shows a flowchart of a method for detecting downlink control information according to an embodiment of the disclosure. As shown in FIG. 5, the flowchart comprises the following steps:

Step S502, a UE receives a resource block set and pre-defined information configured by a base station, wherein the pre-defined information at least includes one of the followings: sub-carrier position information detected in the resource block set, enhanced control channel unit information detected in the resource block set, a mapping mode of an ePDCCH, aggregation level configuration information detected in the resource block set, the amount of candidate set corresponding to the detected aggregation level in the resource block set and a downlink control information format; and step S504, the UE detects downlink control information beared by an enhanced physical downlink control channel (ePDCCH) on the resource block according to the resource block set and the pre-defined information.

In the embodiment, the UE is agilely indicated to detected the downlink control information beared by the ePDCCH in the corresponding physical resource block according to the resource block set and the pre-defined information configured by a base station, so as to save resources of space detected and searched by the UE, thus scheduling efficient of the system is improved.

In the above-mentioned embodiments, the amount of resource blocks contained in the resource block set may be 2, 4, 6, 8, 12 and 16, but is not limited to the above-mentioned values; position information in the resource block set comprises sub-carrier position information in the resource block set; the mapping mode of the ePDCCH comprises continuous mapping and discrete mapping; candidate set configuration comprises the amount of candidate sets corresponding to aggregation levels in a user dedicated search space; and aggregation level configuration information comprises configuration information about the aggregation levels in the user dedicated search space.

The UE determines an aggregation level configuration to be detected according to the amount of valid resource elements contained in one eCCE of detected eCCEs and/or a detected downlink control information format. The aggregation level configuration comprises configuration 1 and/or configuration 2, wherein configuration 1 is: (aggregation level a1, aggregation level a2, aggregation level a3 and aggregation level a4), and a1, a2, a3 and a4 are respectively 1, 2, 4 and 8; configuration 2 is: (aggregation level b1, aggregation level b2, aggregation level b3 and aggregation level b4) or (aggregation level a2, aggregation level a3 and aggregation level a4), and b1, b2, b3 and b4 are respectively 2, 4, 8 and 16 or are respectively 2, 4, 8 and 12.

The UE determines an aggregation level configuration to be detected according to the amount of valid resource elements contained in one eCCE of detected eCCEs and/or a detected downlink control information format, comprising the following modes:

The UE determines an aggregation level configuration to be detected according to a valid code rate of an eCCE of detected eCCEs transmitting downlink control information. When the valid code rate is more than X, configuration 2 is used; and when the valid code rate is less than or equal to X, configuration 1 is used; and X is 0.93 or 1.

When a maximal bit amount actually transmitted by an eCCE of eCCEs detected by the UE is less than the bit amount contained by downlink control information, the aggregation level to be detected is configuration 1, and when a maximal bit amount actually transmitted by an eCCE of eCCEs detected by the UE is more than or equal to the bit amount contained by the downlink control information, the aggregation level to be detected is configuration 2.

When the UE detects that a downlink control information format is format 0 or format 1A, an aggregation level to be detected is configuration 1; when the UE detects that the downlink control information format is format 2C, the aggregation level to be detected is configuration 2.

Figure 6:
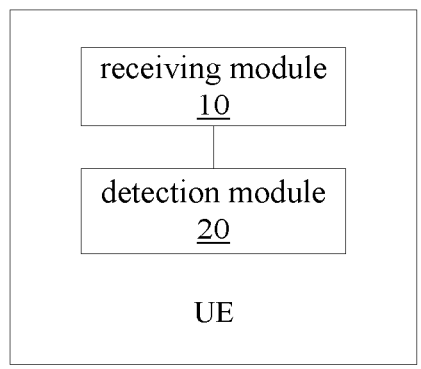
FIG. 6 shows a structure diagram of a UE according to an embodiment of the disclosure.

FIG. 6 shows a structure diagram of a UE according to an embodiment of the disclosure. As shown in FIG. 6, the UE includes: a receiving module 10, configured to receive a resource block set and pre-defined information configured by a base station, wherein the pre-defined information at least comprises one of the followings: sub-carrier position information detected in the resource block set, enhanced control channel unit information detected in the resource block set, a mapping mode of the ePDCCH, aggregation level configuration information detected in the resource block set, the amount of candidate set corresponding to the detected aggregation level in the resource block set and a downlink control information format; and a detection module 20, configured to detect downlink control information beared by an enhanced physical downlink control channel (ePDCCH) on a resource block according to the resource block set and the pre-defined information.

In the embodiment, the UE is agilely indicated to detected the downlink control information beared by the ePDCCH in the corresponding physical resource block according to the resource block set and the pre-defined information configured by a base station, so as to save resources of space detected and searched by the UE, thus scheduling efficient of the system is improved.

Figure 7:
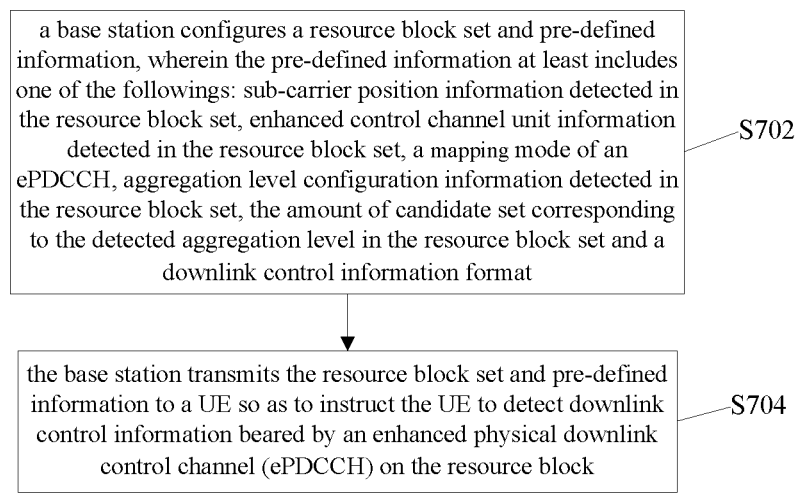
FIG. 7 shows a flowchart of a method for transmitting downlink control information according to an embodiment of the disclosure.

FIG. 7 shows a flowchart of a method for transmitting downlink control information according to an embodiment of the disclosure. As shown in FIG. 7, the flowchart includes the following steps:

step S702, a base station configures a resource block set and pre-defined information, wherein the pre-defined information at least includes one of the followings: sub-carrier position information detected in the resource block set, enhanced control channel unit information detected in the resource block set, a mapping mode of an ePDCCH, aggregation level configuration information detected in the resource block set and the amount of candidate set and a downlink control information format corresponding to the detected aggregation level in the resource block set; and step S704, the base station transmits the resource block set and pre-defined information to a UE so as to instruct the UE to detect downlink control information beared by an enhanced physical downlink control channel (ePDCCH) on the resource block.

In the embodiment, the UE is agilely indicated to detected the downlink control information beared by the ePDCCH in the corresponding physical resource block according to the resource block set and the pre-defined information configured by a base station, so as to save resources of space detected and searched by the UE, thus scheduling efficient of the system is improved.

Figure 8:
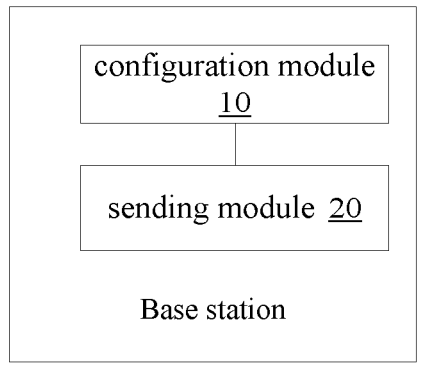
FIG. 8 shows a structural block diagram of a base station according to an embodiment of the disclosure.

FIG. 8 shows a structural block diagram of a base station according to an embodiment of the disclosure. As shown in FIG. 8, the base station includes: a configuration module 30, configured to configure a resource block set and pre-defined information, wherein the pre-defined information at least comprises one of the followings: sub-carrier position information detected in the resource block set, enhanced control channel unit information detected in the resource block set, a mapping mode of the ePDCCH, aggregation level configuration information detected in the resource block set and the amount of candidate set and a downlink control information format corresponding to the detected aggregation level in the resource block set; and a transmitting module 40, configured to transmit the resource block set and pre-defined information to a UE so as to instruct the UE to detect downlink control information beared by an enhanced physical downlink control channel (ePDCCH) on a resource block.

In the embodiment, the UE is agilely indicated to detected the downlink control information beared by the ePDCCH in the corresponding physical resource block according to the resource block set and the pre-defined information configured by a base station, so as to save resources of space detected and searched by the UE, thus scheduling efficient of the system is improved.

Embodiment 1

A method for detecting downlink control information has been described in detail in the embodiment of the present invention, and a specific realization flow will be described below in detail in conjunction with the drawings.

A UE detects downlink control information beared by an enhanced physical downlink control channel (ePDCCH) in a resource block according to a resource block set and pre-defined information configured by a base station, wherein the pre-defined information includes one of the following information or a combination thereof: sub-carrier position information detected in a resource block set, enhanced control channel unit information detected in the resource block set, a mapping mode of the ePDCCH, aggregation level configuration information detected in the resource block set and the amount of candidate set and a downlink control information format corresponding to the detected aggregation level in the resource block set.

The amount of resource blocks contained in the resource block set may be 2, 4, 6, 8, 12, 16 and 32, but is not limited to the above-mentioned values; when the amount of resource blocks contained in the resource block set is more than 4, the UE selects 2 or 4 resource blocks as a detected resource block set, and the specific selection mode is as follows:

the UE may select 2 or 4 resource blocks from the resource block set as a detected resource block set according to a UE dedicated configuration; 2 or 4 resource blocks selected from the resource block set by each subframe may be the same, also may be different; and the UE dedicated configuration may be a selection resource block with equal intervals, and each UE is configured with a dedicated starting position.

The mapping mode of the ePDCCH includes continuous mapping and discrete mapping; a downlink control information format is determined according to a mapping mode of data corresponding to downlink control information; an aggregation level a means resources corresponding to the ePDCCH are a enhanced control channel units, and the ePDCCH of the same aggregation level only can be configured to be one mapping mode; and according to the size of a resource corresponding to an aggregation level, and according to an ascending order, all aggregation levels are ranked as N1, N2, . . . Np, where p is a positive integer, wherein ePDCCHs corresponding to the aggregation levels N1, N2, . . . Nq are configured to be continuous mapping, and ePDCCHs corresponding to the aggregation levels N(q+1) . . . Np are configured to be discrete mapping, and q is a positive integer; and q is configured by a base station.

Specific applications are as follows:

aggregation levels are 1, 2, 4 and 8, wherein values of q may be 1, 2, 4, 8, or 1, 2, 4, or 2, 4, 8, or 2, 4, or 1, or 2, or 4, or 8; when q is 2, then 1 and 2 are of continuous mapping, and 4 and 8 are of discrete mapping; and when q is 4, then 1, 2 and 4 are of continuous mapping and 8 is of discrete mapping.

Different cyclic prefix types (a normal cyclic prefix, an extended cyclic prefix) define different aggregation levels.

Specific applications: when the normal cyclic prefix and extended cyclic prefix define sizes of different eCCEs, the normal cyclic prefixes are 2, 4, 8 and 16, and the extended cyclic prefixes are 1, 2, 4 and 8; or the normal cyclic prefixes are 2, 4 and 8, and the extended cyclic prefixed are 1, 2, 4 and 8.

With regard to a TDD system, a UE detects sets of different aggregation levels on a special subframe and a normal subframe, for example:

specific application 1: detecting levels 1, 2, 4 and 8 on the normal subframe, and detecting levels 2, 4, 8 and 16 on the special subframe;

specific application 2: detecting levels 2, 4 and 8 on the normal subframe, and detecting levels 4, 8 and 16 on the special subframe;

specific application 3: detecting levels 1, 2, 4 and 8 on the normal subframe, and detecting levels 4, 8, 16 and 32 on the special subframe;

and specific application 4: detecting levels 4, 8 and 16 on the normal subframe, and detecting levels 8, 16 and 32 on the special subframe, wherein the aggregation level of the special subframe can be configured, also can be fixed.

With regard to the TDD system, on the special subframe, the UE determines a set of detected aggregation levels according to a configuration of the special subframe.

Modes for the UE to determine detecting aggregation levels comprise at least one of the followings:

mode 1: the UE determining an aggregation level configuration to be detected according to a valid code rate of an eCCE of detected eCCEs transmitting downlink control information;

mode 2: the UE determining an aggregation level configuration to be detected according to a maximal bit amount actually transmitted by an eCCE of detected eCCEs;

mode 3: when the UE detects a downlink control information format Y, an aggregation level to be detected is configuration 1; when the UE detects a downlink control information format Z, the aggregation level to be detected is configuration 2;

and mode 4: a base station configuring an aggregation level detected by the UE.

Specific applications are as follows:

aggregation levels required to be detected by the UE are: configuration 1 (aggregation level a1, aggregation level a2, aggregation level a3 and aggregation level a4), configuration 2 (aggregation level b1, aggregation level b2, aggregation level b3 and aggregation level b4); or configuration 1 (aggregation level a1, aggregation level a2, aggregation level a3 and aggregation level a4), and configuration 2 (aggregation level a2, aggregation level a3 and aggregation level a4). a1, a2, a3 and a4 can be 1, 2, 4 and 8, which is only an example and is not limited to the values; b1, b2, b3 and b4 can be 2, 4, 8 and 16, or 2, 4, 8 and 12, which is only an example and is not limited to the values.

The UE determines an aggregation level configuration to be detected according to the amount of valid resource elements contained in one eCCE of detected eCCEs and/or a detected downlink control information format (the bit amount contained by downlink control information), specifically comprising the following modes:

mode 1: the UE determining an aggregation level configuration to be detected according to a valid code rate of an eCCE of detected eCCEs transmitting downlink control information, i.e when said valid code rate is more than X, configuration 2 is used, and when said valid code rate is less than or equal to X, configuration 1 is used; and X can be 0.93 or 1, but is not limited to the values;

mode 2: the UE determining the aggregation level configuration to be detected according to a maximal bit amount actually transmitted by an eCCE of detected eCCEs, i.e. the maximal bit amount actually transmitted by said eCCE is less than the bit amount contained by downlink control information, the aggregation level to be detected is configuration 1, and when a maximal bit amount actually transmitted by the eCCE is more than the bit amount contained by the downlink control information, the aggregation level to be detected is configuration 2;

mode 3: when the UE detects a downlink control information format Y, an aggregation level to be detected is configuration 1; when the UE detects a downlink control information format Z, the aggregation level to be detected is configuration 2; and Y can be 0, 1A, and Z can be 2C and 4, and is not limited to the above-mentioned values; and mode 4: a base station transmits a signalling to instruct an aggregation level to be detected by the UE.

Assuming that the aggregation levels detected by the UE are aggregation level a1, aggregation level a2, aggregation level a3 and aggregation level a4, and the amount of candidate sets corresponding to each aggregation level is c1, c2, c3 and c4, then when the UE only detects aggregation level a2, aggregation level a3 and aggregation level a4, the amount of candidate sets corresponding to each aggregation level is c2, c3 and c4, or the amount of candidate sets corresponding to each aggregation level is d2, d3 and d4, wherein d2+d3+d4 is less than or equal to c1+c2+c3+c4;

specific applications are as follows:

c1, c2, c3 and c4 are respectively 6, 6, 2 and 2, or 8, 4, 2 and 2, or 4, 8, 2 and 2, then d2, d3 and d4 are respectively 8, 4 and 4, or 8, 4 and 2, or 12, 2 and 2, or 8, 6 and 2, etc.; and a1, a2, a3 and a4 can be 1, 2, 4 and 8, which is only an example and is not limited to the values;

the aggregation levels detected by the UE are aggregation level a1, aggregation level a2, aggregation level a3 and aggregation level a4, and the amount of candidate sets corresponding to each aggregation level is c1, c2, c3 and c4, then c1, c2, c3 and c4 are respectively 6, 6, 2 and 2, or 8, 4, 2 and 2, or 4, 8, 2 and 2, or 4, 4, 4 and 4, or 4, 6, 4 and 2.

Different cyclic prefixes correspond to different amounts of candidate sets.

Specific applications are as follows:

the aggregation levels detected by the UE are aggregation level a1, aggregation level a2, aggregation level a3 and aggregation level a4, and the amount of candidate sets corresponding to each aggregation level is c1, c2, c3 and c4, then normal cyclic prefixes c1, c2, c3 and c4 are 4, 8, 2 and 2, and extended cyclic prefixes c1, c2, c3 and c4 are 8, 4, 2 and 2, or the normal cyclic prefixes c1, c2, c3 and c4 are 4, 6, 4 and 2, and the extended cyclic prefixes c1, c2, c3 and c4 are 6, 6, 2 and 2;

eCCE corresponding to ePDCCH which is of continuous mapping is called as L-eCCE being mapped on one resource block, and the eCCE corresponding to ePDCCH which is of discrete mapping is called as D-eCCE being mapped on several resource blocks.

Figure 9:
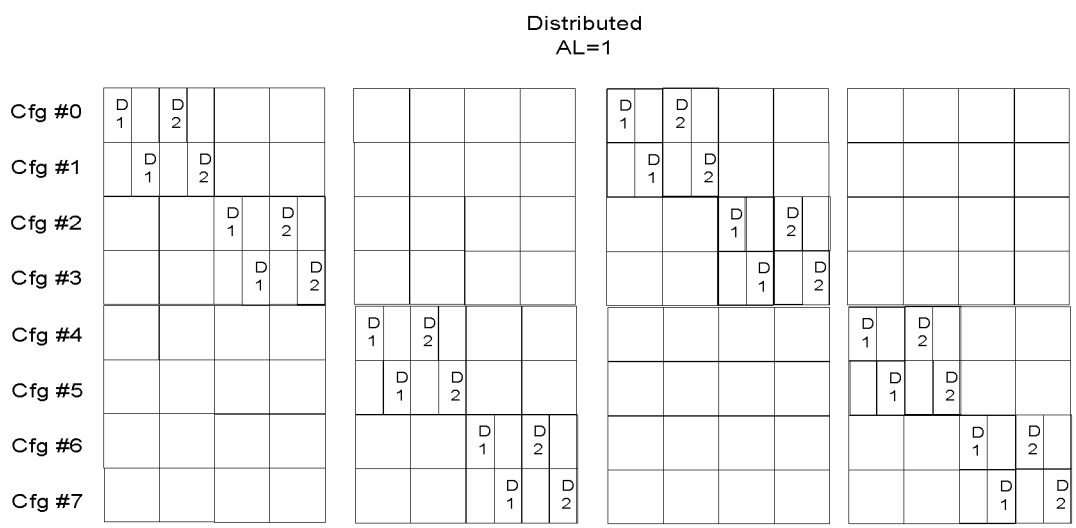
FIGS. 9 and 10 show schematic diagrams of a sub-carrier corresponding to a resource group when the aggregation level is 1 according to embodiment one of the disclosure.
Figure 10:
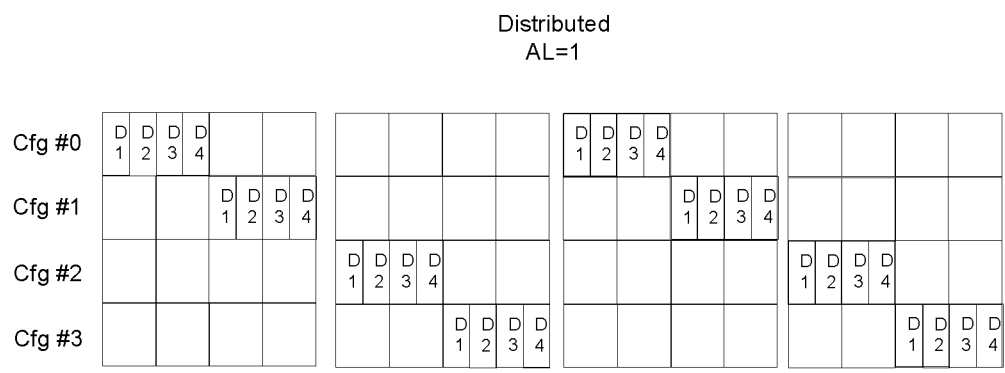
Figure 11:
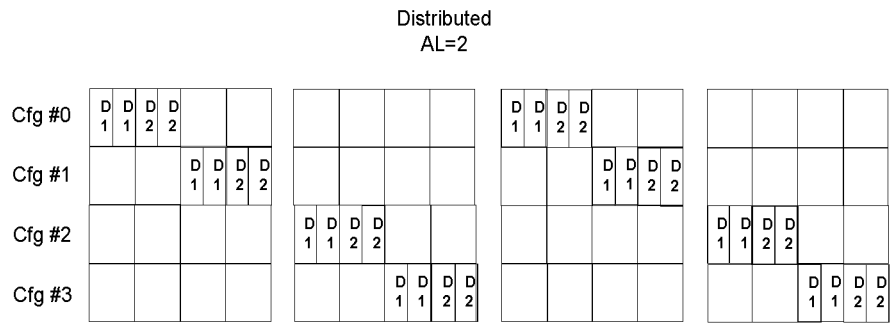
FIGS. 11-13 show schematic diagrams of a sub-carrier corresponding to a resource group when the aggregation level is 2 according to embodiment one of the disclosure.

Assuming that a resource block set comprises 4 resource blocks, and each resource block includes 4 enhanced control channel units, and each enhanced control channel unit includes 2 resource groups, and all resource groups are numbered from #0 to #31, and aggregation level a means that resources corresponding to the ePDCCH are a enhanced control channel units, then when the mapping mode is discrete mapping, the sub-carrier position information detected in the resource block set is at least one of the followings:

As shown in FIGS. 9 and 11, when the aggregation level is 1, the sub-carrier position information detected in the resource block set is one of {(#0, #16), (#2, #18)}, {(#1, #17), (#3, #19)}, {(#4, #20), (#6, #22)}, {(#5, #21), (#7, #23)}, {(#8, #24), (#10, #26)}, {(#9, #25), (#11, #27)}, {(#12, #28), (#14, #30)}, {(#13, #29), (#15, #31)}, {(#0, #16), (#1, #17), (#2, #18), (#3, #19)}, {(#4, #20), (#5, #21), (#6, #22), (#7, #23)}, {(#8, #24), (#9, #25), (#10, #26), (#11, #27)} and {(#12, #28), (#13, #29), (#14, #30), (#15, #31)} or a sub-carrier corresponding to a resource group combined from the above position information.

Figure 12:
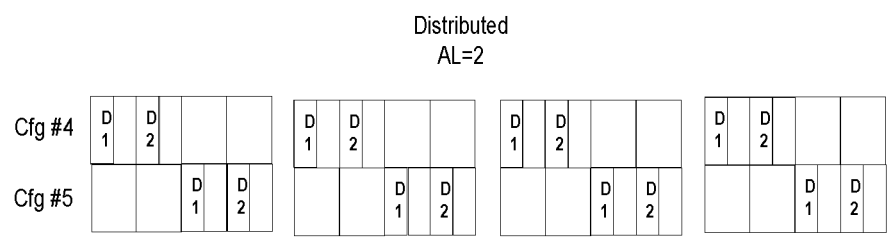
Figure 13:
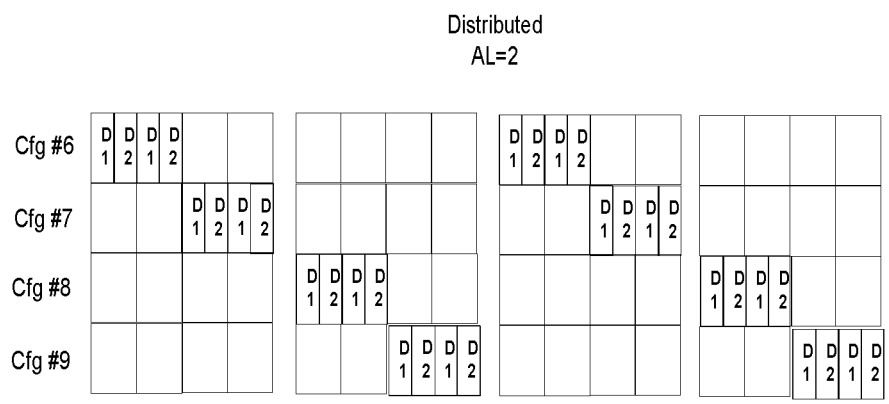

As shown in FIGS. 11-13, when the aggregation level is 2, the sub-carrier position information detected in the resource block set is one of {(#0, #1, #16, #17), (#2, #3, #18, #19)}, {(#4, #5, #20, #21), (#6, #7, #22, #23)}, {(#8, #9, #24, #25), (#10, #11, #26, #27)}, {(#12, #13, #28, #29), (#14, #15, #30, #31)}, {(#0, #8, #16, #24), ((#2, #10, #18, #26))}, {(#1, #9, #17, #25), ((#3, #11, #19, #27))}, {(#4, #12, #20, #28), ((#6, #14, #22, #30))}, {(#5, #13, #21, #29), ((#7, #15, #23, #31))} or a sub-carrier corresponding to a resource group combined from the above position information.

The resource block set comprises 2 resource blocks, each resource block includes 4 enhanced control channel units, and all enhanced control channel units are numbered from #0 to #7, and aggregation level a means that resources corresponding to the ePDCCH are a enhanced control channel units, then enhanced control channel unit information detected in the resource block set is at least one of the followings:

when the mapping mode is continuous mapping and the aggregation level is 1, the enhanced control channel unit information detected in the resource block set is from #0 to #7;

when the mapping mode is continuous mapping and the aggregation level is 2, the enhanced control channel unit information detected in the resource block set is {#0, #1}, {#2, #3}, {#4, #5} and {#6, #7};

when the mapping mode is continuous mapping and the aggregation level is 4, the enhanced control channel unit information detected in the resource block set is {#0, #1, #2, #3} and {#4, #5, #6, #7};

when the mapping mode is discrete mapping and the aggregation level is 2, the enhanced control channel unit information detected in the resource block set is {#0, #4}, {#1, #5}, {#2, #6} and {#3, #7};

and when the mapping mode is discrete mapping and the aggregation level is 4, the enhanced control channel unit information detected in the resource block set is {#0, #2, #4, #6} and {#1, #3, #5, #7}.

The resource block set comprises 2 resource blocks, each resource block includes 4 enhanced control channel units, and all enhanced control channel units are numbered from #0 to #7, and aggregation level a means that resources corresponding to the ePDCCH are a enhanced control channel units, then enhanced control channel unit information detected in said resource block set is at least one of the followings:

when the mapping mode is continuous mapping and the aggregation level is 1, the enhanced control channel unit information detected in the resource block set is from #0 to #7;

when the mapping mode is continuous mapping and the aggregation level is 2, the enhanced control channel unit information detected in the resource block set is {#0, #1}, {#2, #3}, {#4, #5} and {#6, #7};

when the mapping mode is continuous mapping and the aggregation level is 4, the enhanced control channel unit information detected in the resource block set is {#0, #1, #2, #3} and {#4, #5, #6, #7};

when the mapping mode is discrete mapping and the aggregation level is 2, the enhanced control channel unit information detected in the resource block set is {#0, #4}, {#1, #5}, {#2, #6} and {#3, #7};

and when the mapping mode is discrete mapping and the aggregation level is 4, the enhanced control channel unit information detected in the resource block set is {#0, #2, #4, #6} and {#1, #3, #5, #7}.

A specific search space is defined as follows:

the search space is defined in the unit of PRB, and different UEs perform detecting on the same PRB according to the same preset combination, for example: the search space of the UE is defined by two PRBs (determining according to PRB set).

Figures 14, 15, 16:
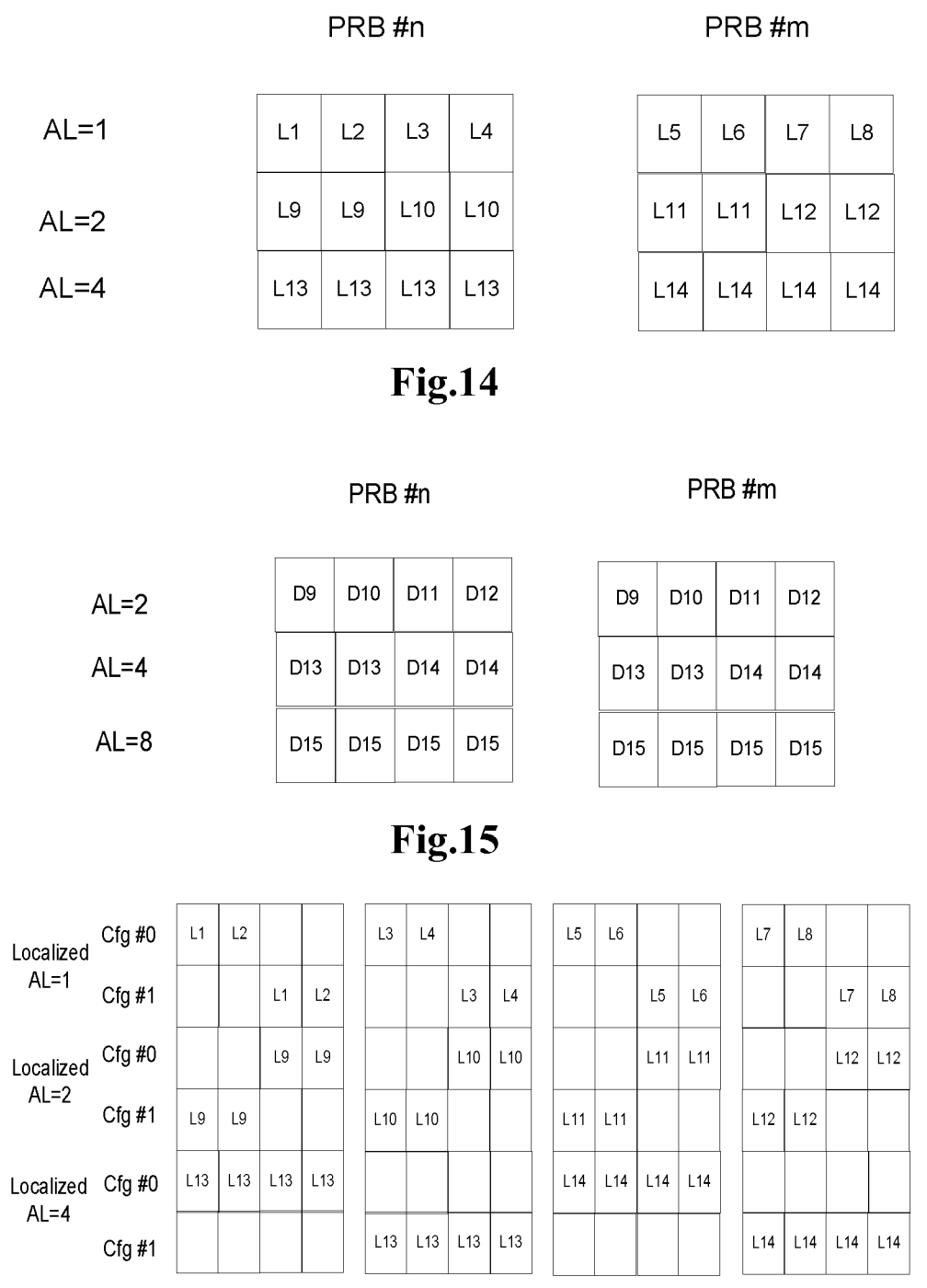

With regard to continuous mapping, 14 candidate sets are defined as shown in FIG. 14 and are indicated by L1 to L14; with regard to discrete mapping, 7 candidate sets also can be defined as shown in FIG. 15 and are indicated by D9 to D15.

The resource block set comprises 4 resource blocks, each resource block includes 4 enhanced control channel units, and all enhanced control channel units are numbered from #0 to #15, and aggregation level a means that resources corresponding to the ePDCCH are a enhanced control channel units, then enhanced control channel unit information detected in the resource block set is at least one of the followings:

when the mapping mode is continuous mapping and the aggregation level is 1, the enhanced control channel unit information detected in the resource block set is {#0, #2, #4, #6, #8, #10, #12, #14} or {#1, #3, #5, #7, #9, #11, #13, #15};

when the mapping mode is continuous mapping and the aggregation level is 2, the enhanced control channel unit information detected in the resource block set is {(#0, #1), (#4, #5), (#8, #9), (#12, #13)} or {(#2, #3), (#6, #7), (#10, #11), (#14, #15)};

when the mapping mode is continuous mapping and the aggregation level is 4, the enhanced control channel unit information detected in the resource block set is {(#0, #1, #2, #3), (#8, #9, #10, #11)} or {(#4, #5, #6, #7), (#12, #13, #14, #15)};

when the mapping mode is discrete mapping and the aggregation level is 2, the enhanced control channel unit information detected in the resource block set is {(#0, #8), (#2, #10), (#4, #12), (#6, #14)} or {(#1, #9), (#3, #11), (#5, #13), (#7, #15)};

when the mapping mode is discrete mapping and the aggregation level is 4, the enhanced control channel unit information detected in the resource block set is {(#0, #4, #8, #12), (#2, #6, #10, #14)} or {(#1, #5, #9, #13), (#3, #7, #11, #15)};

when the mapping mode is discrete mapping and the aggregation level is 8, the enhanced control channel unit information detected in the resource block set is {(#0, #2, #4, #6, #8, #10, #12, #14), (#1, #3, #5, #7, #8, #9, #11, #13)}.

The search space is defined in the unit of PRB, and different UEs can perform detecting on the same PRB according to different preset combinations; and aggregation level 1 and aggregation level 2 correspond to different resources so as to decrease the simultaneous blocking probability of different aggregation levels. (determining according to PRB set and pattern Index).

Figures 17, 18:
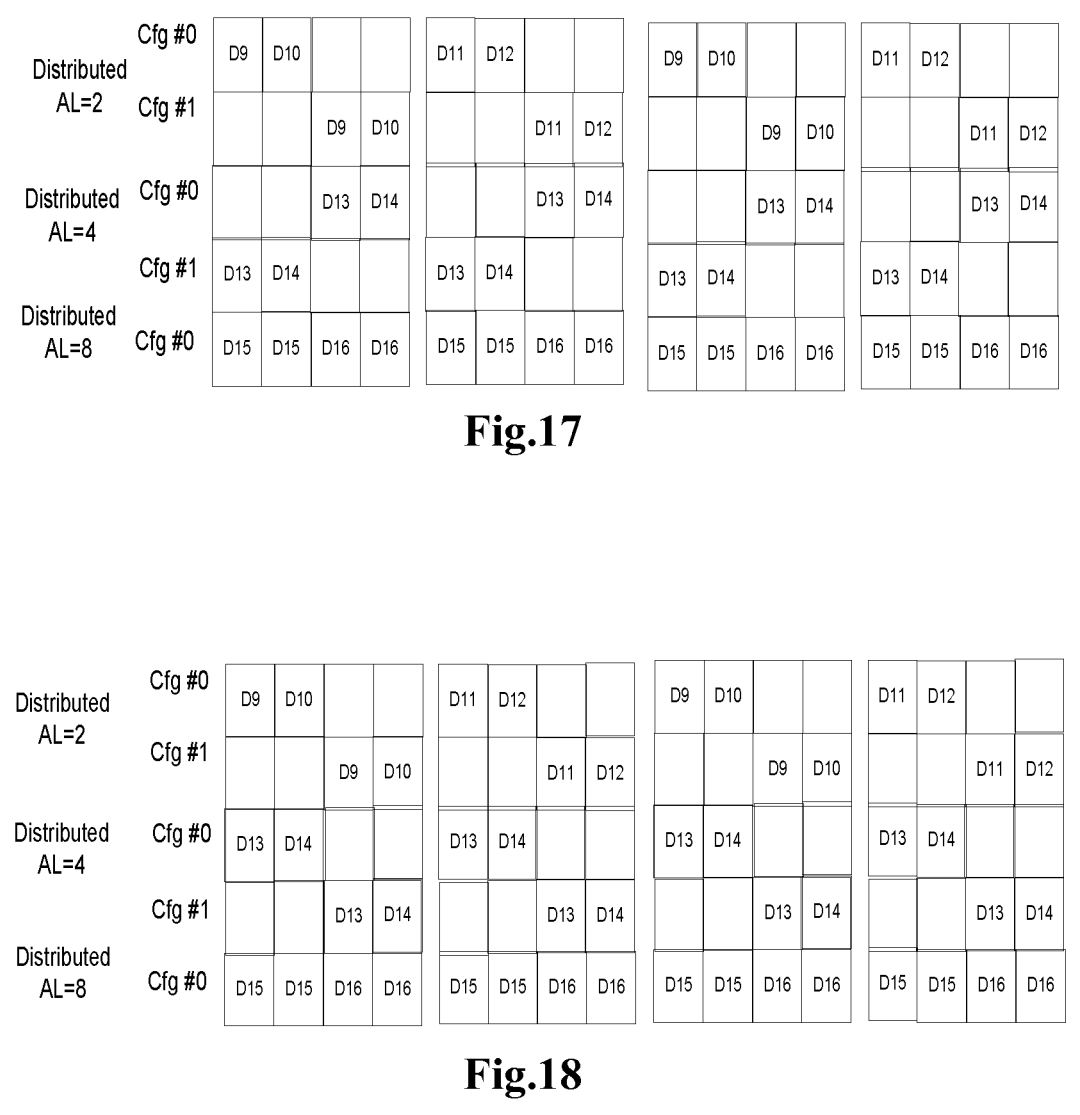
Figure 19:
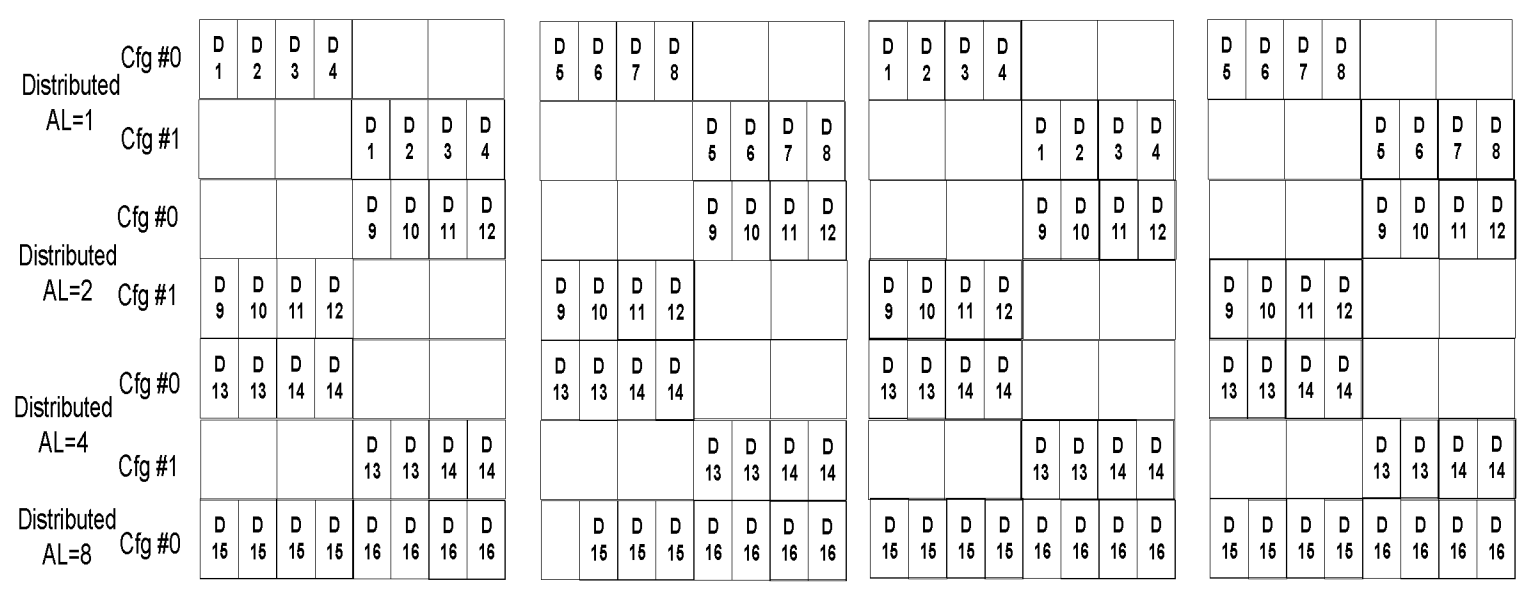
Figure 20:
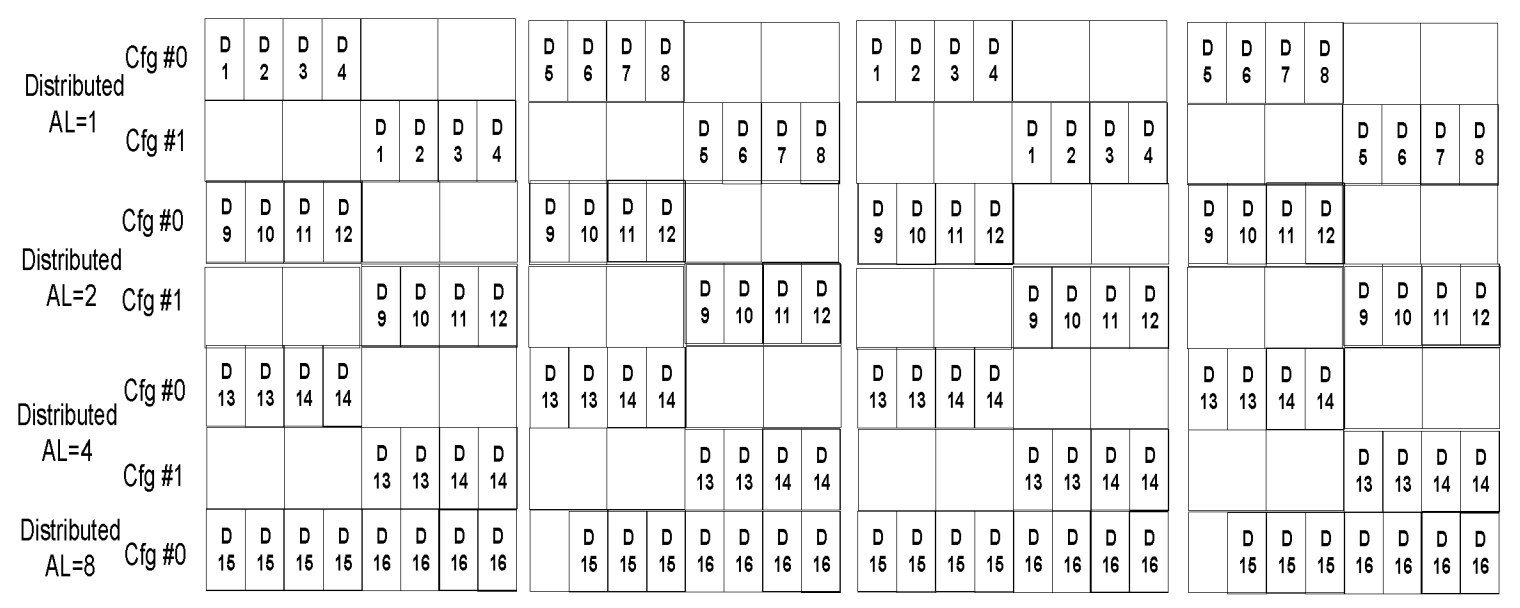

With regard to continuous mapping, two configurations are defined as shown in FIG. 16, and each one is configured with 14 candidate sets which are indicated by L1 to L14. With regard to discrete mapping, two configurations as shown in FIGS. 17 and 18 also can be defined, and each one with configured with 8 candidate sets which are indicated by D9 to D15; or two configurations as shown in FIGS. 19 and 20, each one is configured with 16 candidate sets which are indicated by D1 to D16.

Figure 21:
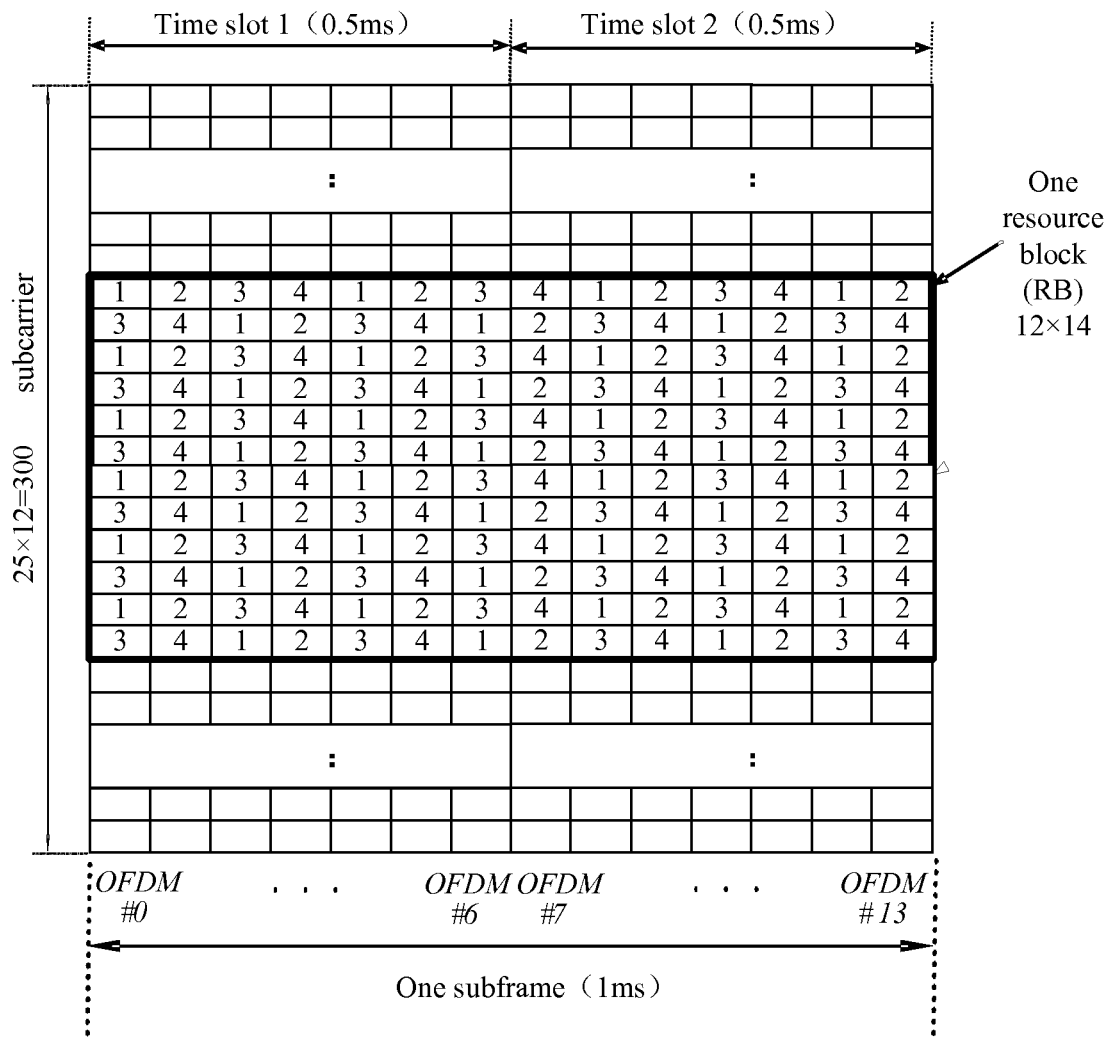
FIG. 21 shows a schematic diagram of 1 resource block being divided into 4 eCCEs according to embodiment one of the disclosure.

According to a mode of time domain first and then frequency domain, resources are divided in accordance with 1 (or 2) resource element being granularity, which is specifically as follows:

one resource block is divided into 4 eCCEs, as shown in FIG. 21; different numbers represent different eCCEs.

Figure 22:
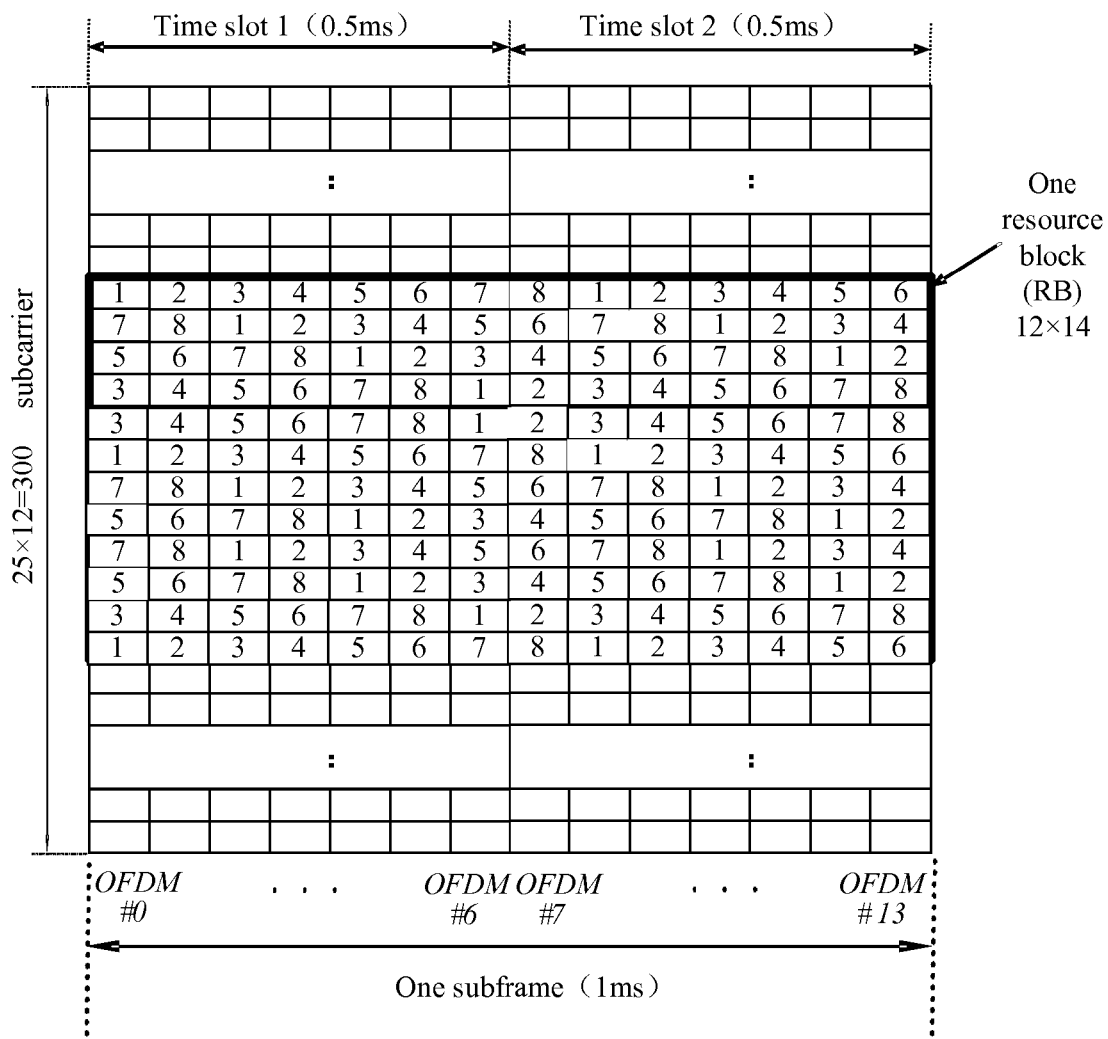
FIG. 22 shows a schematic diagram of 1 resource block being divided into 8 eCCEs according to embodiment one of the disclosure.

Groups are divided according to frequency domain sub-carriers, and different groups correspond to different resource dividing;

one resource block is divided into 8 eREGs (enhanced resource group), and in the unit of 4 sub-carriers, resource blocks are divided into 3 groups, and relevant positions in different groups corresponding to the same eREG number are different, and as shown in FIG. 22, different numbers represent different eREGs.

In another embodiment, software is also provided, and the software is used to execute the technical solution described in the above-mentioned embodiment.

In another embodiment, a storage medium is also provided, wherein the storage medium stores the above-mentioned software, and the storage medium comprises but is not limited to an optical disk, a soft disk, a hard disk, an erasable storage, etc.

In the above-mentioned each embodiment of the present invention, the UE is agilely indicated to detected the downlink control information beared by the ePDCCH in the corresponding physical resource block according to the resource block set and the pre-defined information configured by a base station, so as to save resources of space detected and searched by the UE, thus scheduling efficient of the system is improved.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the present invention is not restricted to any particular hardware and software combination.

The above description is only preferred embodiments of the present invention and is not intended to limit the present invention, and the present invention can have a variety of changes and modifications for ordinary person skilled in the field. Any modification, equivalent replacement, or improvement made within the spirit and principle of the present invention shall all fall within the protection scope of the present invention.

The invention claimed is:

1. A method for detecting downlink control information, comprising:
    a user equipment (UE) detecting downlink control information beared by an enhanced physical downlink control channel (ePDCCH) in a resource block according to a resource block set and pre-defined information configured by a base station, wherein the pre-defined information includes: enhanced control channel unit information detected in the resource block set, a mapping mode of the ePDCCH; and the pre-defined information further at least includes one of the followings: sub-carrier position information detected in the resource block set, aggregation level configuration information detected in the resource block set, the amount of candidate set corresponding to the detected aggregation level in the resource block set, and a downlink control information format;
    wherein the mapping mode of the ePDCCH comprises continuous mapping and/or discrete mapping;
    wherein ePDCCHs of the same aggregation level are configured to be of the same mapping mode;
    wherein according to the size of a resource corresponding to an aggregation level, and according to an ascending order, all aggregation levels are ranked as N1, N2, . . . Np, where p is a positive integer, wherein ePDCCHs corresponding to the aggregation levels N1, N2, . . . Nq are configured to be continuous mapping, and ePDCCHs corresponding to the aggregation levels N(q+1) . . . Np are configured to be discrete mapping, and q is a positive integer;
    wherein q is configured by the base station, or q is a fixed value, or with regard to subframes of different cyclic prefix types, different q values are defined, wherein the cyclic prefixes comprise a normal cyclic prefix and an extended cyclic prefix.

2. The method according to claim 1, wherein the amount of resource blocks in the resource block set is one of the followings: 2, 4, 6, 8, 12 and 16; or the downlink control information format is determined according to a mapping mode of data corresponding to the downlink control information.

3. The method according to claim 2, wherein the UE selects 2 or 4 resource blocks as a detected resource block set when the amount of resource blocks contained in the resource block set is greater than 4.

4. The method according to claim 1, wherein with regard to a TDD system, the UE detects sets of different aggregation levels on a special subframe and a normal subframe, wherein with regard to the TDD system, on the special subframe, the UE determines a set of detected aggregation levels according to a configuration of the special subframe.

5. The method according to claim 1, wherein the mode for determining detected aggregation levels at least comprises one of the followings:
    mode 1: the UE determining an aggregation level configuration to be detected according to a valid code rate of an eCCE of detected eCCEs transmitting downlink control information;

mode 2: the UE determining an aggregation level configuration to be detected according to a maximal bit amount actually transmitted by an eCCE of detected eCCEs;

mode 3: the UE determining an aggregation level configuration to be detected according to the category of the detected downlink control information format; and mode 4: the base station configuring an aggregation level detected by the UE.

6. The method according to claim 5, wherein the aggregation level configuration to be detected by the UE comprises configuration 1 and/or configuration 2, wherein the configuration 1 comprises aggregation level a1, aggregation level a2, aggregation level a3, and aggregation level a4, and the configuration 2 comprises aggregation level b1, aggregation level b2, aggregation level b3, and aggregation level b4; or the configuration 2 comprises aggregation level a2, aggregation level a3, and aggregation level a4, wherein a1, a2, a3 and a4 are respectively 1, 2, 4 and 8; and b1, b2, b3 and b4 are respectively 2, 4, 8 and 16 or are respectively 2, 4, 8 and 12.

7. The method according to claim 6, wherein when the valid code rate is more than X, configuration 2 is used, and when the valid code rate is less than or equal to X, configuration 1 is used; and X is a pre-set threshold;

when the maximal bit amount transmitted by the eCCE is less than the bit amount contained in downlink control information, the aggregation level to be detected is configuration 1, and when a maximal bit amount transmitted by the eCCE is more than the bit amount contained in the downlink control information, the aggregation level to be detected is configuration 2.

8. The method according to claim 1, wherein, the aggregation levels detected by the UE are aggregation level a1, aggregation level a2, aggregation level a3 and aggregation level a4, and the amount of candidate sets corresponding to each aggregation level is respectively c1, c2, c3 and c4, and when the UE detects aggregation level a2, aggregation level a3 and aggregation level a4, the amount of candidate sets corresponding to each aggregation level is c2, c3 and c4, or the amount of candidate sets corresponding to each aggregation level is d2, d3 and d4, wherein d2+d3+d4 is less than or equal to c1+c2+c3+c4, and a1, a2, a3, a4, c1, c2, c3, c4, d2, d3 and d4 are all positive integers; or the aggregation levels detected by the UE are aggregation level a1, aggregation level a2, aggregation level a3 and aggregation level a4, and the amount of candidate sets corresponding to each aggregation level is respectively c1, c2, c3 and c4, wherein c1, c2, c3 and c4 are respectively 6, 6, 2 and 2, or are respectively 8, 4, 2 and 2, or are respectively 4, 8, 2 and 2, or are respectively 4, 4, 4 and 4, or are respectively 4, 6, 4 and 2, and a1, a2, a3 and a4 are positive integers.

9. The method according to claim 1, wherein the resource block set comprises 4 resource blocks, and each resource block comprises 4 enhanced control channel units, and each enhanced control channel unit comprises 2 resource groups, and all resource groups are numbered from #0 to #31, and aggregation level a means that resources corresponding to the ePDCCH are a enhanced control channel units, and when the mapping mode is discrete mapping, the sub-carrier position information detected in the resource block set is at least one of the followings:

when the aggregation level is 1, the sub-carrier position information detected in the resource block set is one of {(#0, #16), (#2, #18)}, {(#1, #17), (#3, #19)}, {(#4, #20), (#6, #22)}, {(#5, #21), (#7, #23)}, {(#8, #24), (#10, #26)}, {(#9, #25), (#11, #27)}, {(#12, #28), (#14, #30)}, {(#13, #29), (#15, #31)}, {(#0, #16), (#1, #17), (#2, #18), (#3, #19)}, {(#4, #20), (#5, #21), (#6, #22), (#7, #23)}, {(#8, #24), (#9, #25), (#10, #26), (#11, #27)} and {(#12, #28), (#13, #29), (#14, #30), (#15, #31)} or a sub-carrier corresponding to a combined resource group;

or, when the aggregation level is 2, the sub-carrier position information detected in the resource block set is one of {(#0, #1, #16, #17), (#2, #3, #18, #19)}, {(#4, #5, #20, #21), (#6, #7, #22, #23)}, {(#8, #9, #24, #25), (#10, #11, #26, #27)}, {(#12, #13, #28, #29), (#14, #15, #30, #31)}, {(#0, #8, #16, #24), ((#2, #10, #18, #26))}, {(#1, #9, #17, #25), ((#3, #11, #19, #27))}, {(#4, #12, #20, #28), ((#6, #14, #22, #30))}, {(#5, #13, #21, #29), ((#7, #15, #23, #31))} or a sub-carrier corresponding to a combined resource group; or the resource block set comprises 2 resource blocks, each resource block comprising 4 enhanced control channel units, and all enhanced control channel units are numbered from #0 to #7, and aggregation level a means that resources corresponding to the ePDCCH are a enhanced control channel units, and enhanced control channel unit information detected in the resource block set is at least one of the followings:

when the mapping mode is continuous mapping and the aggregation level is 1, the enhanced control channel unit information detected in the resource block set is from #0 to #7;

or, when the mapping mode is continuous mapping and the aggregation level is 2, the enhanced control channel unit information detected in the resource block set is {#0, #1}, {#2, #3}, {#4, #5} and {#6, #7};

or, when the mapping mode is continuous mapping and the aggregation level is 4, the enhanced control channel unit information detected in the resource block set is {#0, #1, #2, #3} and {#4, #5, #6, #7};

or, when the mapping mode is discrete mapping and the aggregation level is 2, the enhanced control channel unit information detected in the resource block set is {#0, #4}, {#1, #5}, {#2, #6} and {#3, #7};

or, when the mapping mode is discrete mapping and the aggregation level is 4, the enhanced control channel unit information detected in the resource block set is {#0, #2, #4, #6} and {#1, #3, #5, #7}; or the resource block set comprises 4 resource blocks, each resource block comprising 4 enhanced control channel units, and all enhanced control channel units are numbered from #0 to #15, and aggregation level a means that resources corresponding to the ePDCCH are a enhanced control channel units, and enhanced control channel unit information detected in the resource block set is at least one of the followings:

when the mapping mode is continuous mapping and the aggregation level is 1, the enhanced control channel unit information detected in the resource block set is {#0, #2, #4, #6, #8, #10, #12, #14} or {#1, #3, #5, #7, #9, #11, #13, #15};

or, when the mapping mode is continuous mapping and the aggregation level is 2, the enhanced control channel unit information detected in the resource block set is {(#0, #1), (#4, #5), (#8, #9), (#12, #13)} or {(#2, #3), (#6, #7), (#10, #11), (#14, #15)};

or, when the mapping mode is continuous mapping and the aggregation level is 4, the enhanced control channel unit information detected in the resource block set is {(#0, #1, #2, #3), (#8, #9, #10, #11)} or {(#4, #5, #6, #7), (#12, #13, #14, #15)};

or, when the mapping mode is discrete mapping and the aggregation level is 2, the enhanced control channel unit information detected in the resource block set is {(#0, #8), (#2, #10), (#4, #12), (#6, #14)} or {(#1, #9), (#3, #11), (#5, #13), (#7, #15)};

or, when the mapping mode is discrete mapping and the aggregation level is 4, the enhanced control channel unit information detected in the resource block set is {(#0, #4, #8, #12), (#2, #6, #10, #14)} or {(#1, #5, #9, #13), (#3, #7, #11, #15)};

or, when the mapping mode is discrete mapping and the aggregation level is 8, the enhanced control channel unit information detected in the resource block set is {(#0, #2, #4, #6, #8, #10, #12, #14), (#1, #3, #5, #7, #8, #9, #11, #13)}.

10. The method according to claim 1, wherein different cyclic prefixes correspond to different aggregation levels, or different cyclic prefixes correspond to different amounts of candidate sets.

11. A user equipment (UE), comprising:
a receiving module, configured to receive a resource block set and pre-defined information configured by a base station, wherein the pre-defined information includes: enhanced control channel unit information detected in the resource block set, a mapping mode of an ePDCCH; and the pre-defined information further at least includes one of the followings: sub-carrier position information detected in the resource block set, aggregation level configuration information detected in the resource block set, the amount of candidate set corresponding to the detected aggregation level in the resource block set, and a downlink control information format; and
a detection module, configured to detect downlink control information beared by an enhanced physical downlink control channel (ePDCCH) on the resource block according to the resource block set and the pre-defined information;
wherein the mapping mode of the ePDCCH comprises continuous mapping and/or discrete mapping;
wherein ePDCCHs of the same aggregation level are configured to be of the same mapping mode;
wherein according to the size of a resource corresponding to an aggregation level, and according to an ascending order, all aggregation levels are ranked as N1, N2, ... Np, where p is a positive integer, wherein ePDCCHs corresponding to the aggregation levels N1, N2, ... Nq are configured to be continuous mapping, and ePDCCHs corresponding to the aggregation levels N(q+1) ... Np are configured to be discrete mapping, and q is a positive integer;
wherein q is configured by the base station, or q is a fixed value, or with regard to subframes of different cyclic prefix types, different q values are defined, wherein the cyclic prefixes comprise a normal cyclic prefix and an extended cyclic prefix.

12. The UE according to claim 11, wherein the amount of resource blocks in the resource block set is one of the followings: 2, 4, 6, 8, 12 and 16.

13. The UE according to claim 11, wherein the mode for determining detected aggregation levels at least comprises one of the followings:

mode 1: the UE determining an aggregation level configuration to be detected according to a valid code rate of an eCCE of detected eCCEs transmitting downlink control information;

mode 2: the UE determining an aggregation level configuration to be detected according to a maximal bit amount actually transmitted by an eCCE of detected eCCEs;

mode 3: the UE determining an aggregation level configuration to be detected according to the category of the detected downlink control information format; and mode 4: the base station configuring an aggregation level detected by the UE.

14. The UE according to claim 13, wherein the aggregation level configuration to be detected by the UE comprises configuration 1 and/or configuration 2, wherein the configuration 1 comprises aggregation level a1, aggregation level a2, aggregation level a3, and aggregation level a4, and the configuration 2 comprises aggregation level b1, aggregation level b2, aggregation level b3, and aggregation level b4; or the configuration 2 comprises aggregation level a2, aggregation level a3, and aggregation level a4, wherein a1, a2, a3 and a4 are respectively 1, 2, 4 and 8; and b1, b2, b3 and b4 are respectively 2, 4, 8 and 16 or are respectively 2, 4, 8 and 12.

15. The UE according to claim 14, wherein
when the valid code rate is more than X, configuration 2 is used, and when the valid code rate is less than or equal to X, configuration 1 is used; and X is a pre-set threshold;
when the maximal bit amount transmitted by the eCCE is less than the bit amount contained in downlink control information, the aggregation level to be detected is configuration 1, and when a maximal bit amount transmitted by the eCCE is more than the bit amount contained in the downlink control information, the aggregation level to be detected is configuration 2.

16. The UE according to claim 11, wherein,
the aggregation levels detected by the UE are aggregation level a1, aggregation level a2, aggregation level a3 and aggregation level a4, and the amount of candidate sets corresponding to each aggregation level is respectively c1, c2, c3 and c4, and when the UE only detects aggregation level a2, aggregation level a3 and aggregation level a4, the amount of candidate sets corresponding to each aggregation level is c2, c3 and c4, or the amount of candidate sets corresponding to each aggregation level is d2, d3 and d4, wherein d2+d3+d4 is less than or equal to c1+c2+c3+c4, and a1, a2, a3, a4, c1, c2, c3, c4, d2, d3 and d4 are all positive integers; or
the aggregation levels detected by the UE are: aggregation level a1, aggregation level a2, aggregation level a3 and aggregation level a4, and the amount of candidate sets corresponding to each aggregation level is respectively c1, c2, c3 and c4, wherein c1, c2, c3 and c4 are respectively 6, 6, 2 and 2, or are respectively 8, 4, 2 and 2, or are respectively 4, 8, 2 and 2, or are respectively 4, 4, 4 and 4, or are respectively 4, 6, 4 and 2, and a1, a2, a3 and a4 are positive integers.

17. The UE according to claim 11, wherein the resource block set comprises 4 resource blocks, and each resource block comprises 4 enhanced control channel units, and each enhanced control channel unit comprises 2 resource groups, and all resource groups are numbered from #0 to #31, and aggregation level a means that resources corresponding to the ePDCCH are a enhanced control channel units, and when the mapping mode is discrete mapping, the sub-carrier position information detected in the resource block set is at least one of the followings:
- when the aggregation level is 1, the sub-carrier position information detected in the resource block set is one of {(#0, #16), (#2, #18)}, {(#1, #17), (#3, #19)}, {(#4, #20), (#6, #22)}, {(#5, #21), (#7, #23)}, {(#8, #24), (#10, #26)}, {(#9, #25), (#11, #27)}, {(#12, #28), (#14, #30)}, {(#13, #29), (#15, #31)}, {(#0, #16), (#1, #17), (#2, #18), (#3, #19)}, {(#4, #20), (#5, #21), (#6, #22), (#7, #23)}, {(#8, #24), (#9, #25), (#10, #26), (#11, #27)} and {(#12, #28), (#13, #29), (#14, #30), (#15, #31)} or a sub-carrier corresponding to a combined resource group;
- or, when the aggregation level is 2, the sub-carrier position information detected in the resource block set is one of {(#0, #1, #16, #17), (#2, #3, #18, #19)}, {(#4, #5, #20, #21), (#6, #7, #22, #23)}, {(#8, #9, #24, #25), (#10, #11, #26, #27)}, {(#12, #13, #28, #29), (#14, #15, #30, #31)}, {(#0, #8, #16, #24), ((#2, #10, #18, #26))}, {(#1, #9, #17, #25), ((#3, #11, #19, #27))}, {(#4, #12, #20, #28), ((#6, #14, #22, #30))}, {(#5, #13, #21, #29), ((#7, #15, #23, #31))} or a sub-carrier corresponding to a combined resource group; or
- wherein the resource block set comprises 2 resource blocks, each resource block comprising 4 enhanced control channel units, and all enhanced control channel units are numbered from #0 to #7, and aggregation level a means that resources corresponding to the ePDCCH are a enhanced control channel units, and enhanced control channel unit information detected in the resource block set is at least one of the followings:
- when the mapping mode is continuous mapping and the aggregation level is 1, the enhanced control channel unit information detected in the resource block set is from #0 to #7;
- or, when the mapping mode is continuous mapping and the aggregation level is 2, the enhanced control channel unit information detected in the resource block set is {#0, #1}, {#2, #3}, {#4, #5} and {#6, #7};
- or, when the mapping mode is continuous mapping and the aggregation level is 4, the enhanced control channel unit information detected in the resource block set is {#0, #1, #2, #3} and {#4, #5, #6, #7};
- or, when the mapping mode is discrete mapping and the aggregation level is 2, the enhanced control channel unit information detected in the resource block set is {#0, #4}, {#1, #5}, {#2, #6} and {#3, #7};
- or, when the mapping mode is discrete mapping and the aggregation level is 4, the enhanced control channel unit information detected in the resource block set is {#0, #2, #4, #6} and {#1, #3, #5, #7}; or
- wherein the resource block set comprises 4 resource blocks, and each resource block comprises 4 enhanced control channel units, and all enhanced control channel units are numbered from #0 to #15, and aggregation level a means that resources corresponding to the ePDCCH are a enhanced control channel units, and enhanced control channel unit information detected in the resource block set is at least one of the followings:
- when the mapping mode is continuous mapping and the aggregation level is 1, the enhanced control channel unit information detected in the resource block set is {#0, #2, #4, #6, #8, #10, #12, #14} or {#1, #3, #5, #7, #9, #11, #13, #15};
- or, when the mapping mode is continuous mapping and the aggregation level is 2, the enhanced control channel unit information detected in the resource block set is {(#0, #1), (#4, #5), (#8, #9), (#12, #13)} or {(#2, #3), (#6, #7), (#10, #11), (#14, #15)};
- or, when the mapping mode is continuous mapping and the aggregation level is 4, the enhanced control channel unit information detected in the resource block set is {(#0, #1, #2, #3), (#8, #9, #10, #11)} or {(#4, #5, #6, #7), (#12, #13, #14, #15)};
- or, when the mapping mode is discrete mapping and the aggregation level is 2, the enhanced control channel unit information detected in the resource block set is {(#0, #8), (#2, #10), (#4, #12), (#6, #14)} or {(#1, #9), (#3, #11), (#5, #13), (#7, #15)};
- or, when the mapping mode is discrete mapping and the aggregation level is 4, the enhanced control channel unit information detected in the resource block set is {(#0, #4, #8, #12), (#2, #6, #10, #14)} or {(#1, #5, #9, #13), (#3, #7, #11, #15)};
- or, when the mapping mode is discrete mapping and the aggregation level is 8, the enhanced control channel unit information detected in the resource block set is {(#0, #2, #4, #6, #8, #10, #12, #14), (#1, #3, #5, #7, #8, #9, #11, #13)}.

18. The UE according to claim 11, wherein different cyclic prefixes correspond to different aggregation levels, or different cyclic prefixes correspond to different amounts of candidate sets.

19. A method for transmitting downlink control information, comprising:
- a base station transmitting a configured resource block set and pre-defined information to a UE so as to instruct the UE to detect downlink control information beared by an enhanced physical downlink control channel (ePDCCH) on the resource block, wherein the pre-defined information includes: enhanced control channel unit information detected in the resource block set, a mapping mode of the ePDCCH; and the pre-defined information further at least includes one of the followings: sub-carrier position information detected in the resource block set, aggregation level configuration information detected in the resource block set, the amount of candidate set corresponding to the detected aggregation level in the resource block set, and a downlink control information format;
- wherein the mapping mode of the ePDCCH comprises continuous mapping and/or discrete mapping;
- wherein ePDCCHs of the same aggregation level are configured to be of the same mapping mode;
- wherein according to the size of a resource corresponding to an aggregation level, and according to an ascending order, all aggregation levels are ranked as N1, N2, . . . Np, where p is a positive integer, wherein ePDCCHs corresponding to the aggregation levels N1, N2, . . . Nq are configured to be continuous mapping, and ePDCCHs corresponding to the aggregation levels N(q+1) . . . Np are configured to be discrete mapping, and q is a positive integer;
- wherein q is configured by the base station, or q is a fixed value, or with regard to subframes of different cyclic prefix types, different q values are defined, wherein the cyclic prefixes comprise a normal cyclic prefix and an extended cyclic prefix.

20. The method according to claim 19, wherein the amount of resource blocks in the resource block set is one of the followings: 2, 4, 6, 8, 12 and 16.

21. The method according to claim 19, wherein different cyclic prefixes correspond to different aggregation levels, or different cyclic prefixes correspond to different amounts of candidate sets.

22. The method according to claim 19, wherein the mode for determining detected aggregation levels at least comprises one of the followings:
   mode 1: the UE determining an aggregation level configuration to be detected according to a valid code rate of an eCCE of detected eCCEs transmitting downlink control information;
   mode 2: the UE determining an aggregation level configuration to be detected according to a maximal bit amount actually transmitted by an eCCE of detected eCCEs;
   mode 3: the UE determining an aggregation level configuration to be detected according to the category of the detected downlink control information format; and
   mode 4: the base station configuring an aggregation level detected by the UE.

23. The method according to claim 22, wherein the aggregation level configuration to be detected by the UE comprises configuration 1 and/or configuration 2, wherein the configuration 1 comprises aggregation level a1, aggregation level a2, aggregation level a3, and aggregation level a4, and the configuration 2 comprises aggregation level b1, aggregation level b2, aggregation level b3, and aggregation level b4; or the configuration 2 comprises aggregation level a2, aggregation level a3, and aggregation level a4, wherein a1, a2, a3 and a4 are respectively 1, 2, 4 and 8; and b1, b2, b3 and b4 are respectively 2, 4, 8 and 16 or are respectively 2, 4, 8 and 12.

24. The method according to claim 23, wherein
   when the valid code rate is more than X, configuration 2 is used, and when the valid code rate is less than or equal to X, configuration 1 is used; and X is a pre-set threshold;
   when the maximal bit amount transmitted by the eCCE is less than the bit amount contained in downlink control information, the aggregation level to be detected is configuration 1, and when a maximal bit amount transmitted by the eCCE is more than the bit amount contained in the downlink control information, the aggregation level to be detected is configuration 2.

25. A base station, comprising:
   a configuration module, configured to configure a resource block set and pre-defined information, wherein the pre-defined information includes: enhanced control channel unit information detected in the resource block set, a mapping mode of an ePDCCH; and the pre-defined information further at least includes one of the followings: sub-carrier position information detected in the resource block set, aggregation level configuration information detected in the resource block set, the amount of candidate set corresponding to the detected aggregation level in the resource block set, and a downlink control information format; and
   a transmitting module, configured to transmit the resource block set and pre-defined information to a UE so as to instruct the UE to detect downlink control information beared by an enhanced physical downlink control channel (ePDCCH) on the resource block;
   wherein the mapping mode of the ePDCCH comprises continuous mapping and/or discrete mapping;
   wherein ePDCCHs of the same aggregation level are configured to be of the same mapping mode;
   wherein according to the size of a resource corresponding to an aggregation level, and according to an ascending order, all aggregation levels are ranked as N1, N2, ... Np, where p is a positive integer, wherein ePDCCHs corresponding to the aggregation levels N1, N2, ... Nq are configured to be continuous mapping, and ePDCCHs corresponding to the aggregation levels N(q+1) ... Np are configured to be discrete mapping, and q is a positive integer;
   wherein q is configured by the base station, or q is a fixed value, or with regard to subframes of different cyclic prefix types, different q values are defined, wherein the cyclic prefixes comprise a normal cyclic prefix and an extended cyclic prefix.

26. The base station according to claim 25, wherein the amount of resource blocks in the resource block set is one of the followings: 2, 4, 6, 8, 12 and 16.

27. The base station according to claim 25, wherein different cyclic prefixes correspond to different aggregation levels, or different cyclic prefixes correspond to different amounts of candidate sets.

28. The base station according to claim 25, wherein the mode for determining detected aggregation levels at least comprises one of the followings:
   mode 1: the UE determining an aggregation level configuration to be detected according to a valid code rate of an eCCE of detected eCCEs transmitting downlink control information;
   mode 2: the UE determining an aggregation level configuration to be detected according to a maximal bit amount actually transmitted by an eCCE of detected eCCEs;
   mode 3: the UE determining an aggregation level configuration to be detected according to the category of the detected downlink control information format; and
   mode 4: the base station configuring an aggregation level detected by the UE.

29. The base station according to claim 28, wherein the aggregation level configuration to be detected by the UE comprises configuration 1 and/or configuration 2, wherein the configuration 1 comprises aggregation level a1, aggregation level a2, aggregation level a3, and aggregation level a4, and the configuration 2 comprises aggregation level b1, aggregation level b2, aggregation level b3, and aggregation level b4; or the configuration 2 comprises aggregation level a2, aggregation level a3, and aggregation level a4, wherein a1, a2, a3 and a4 are respectively 1, 2, 4 and 8; and b1, b2, b3 and b4 are respectively 2, 4, 8 and 16 or are respectively 2, 4, 8 and 12.

30. The base station according to claim 29, wherein
   when the valid code rate is more than X, configuration 2 is used, and when the valid code rate is less than or equal to X, configuration 1 is used; and X is a pre-set threshold;
   when the maximal bit amount transmitted by the eCCE is less than the bit amount contained in downlink control information, the aggregation level to be detected is configuration 1, and when a maximal bit amount transmitted by the eCCE is more than the bit amount contained in the downlink control information, the aggregation level to be detected is configuration 2.

* * * * *